US012684040B2

(12) United States Patent
Chow et al.

(10) Patent No.: US 12,684,040 B2
(45) Date of Patent: Jul. 14, 2026

(54) SYSTEM AND METHOD FOR RICH CONTENT BROWSING MULTITASKING ON DEVICE OPERATING SYSTEMS WITH MULTITASKING LIMITATIONS

(71) Applicant: Backbone Labs, Inc., Vancouver, WA (US)

(72) Inventors: Casey Chow, Seattle, WA (US); Rohan Kapur, San Francisco, CA (US); Kauhi Hookano, San Francisco, CA (US)

(73) Assignee: Backbone Labs, Inc., Vancouver, WA (US)

( * ) Notice: Subject to any disclaimer, the term of this patent is extended or adjusted under 35 U.S.C. 154(b) by 147 days.

(21) Appl. No.: 18/076,172

(22) Filed: Dec. 6, 2022

(65) Prior Publication Data

US 2024/0149151 A1 May 9, 2024

Related U.S. Application Data

(60) Provisional application No. 63/422,797, filed on Nov. 4, 2022.

(51) Int. Cl.
*H04L 67/131* (2022.01)
*A63F 13/22* (2014.01)
(Continued)

(52) U.S. Cl.
CPC ............ *H04L 67/131* (2022.05); *A63F 13/22* (2014.09); *A63F 13/25* (2014.09); *A63F 13/537* (2014.09);
(Continued)

(58) Field of Classification Search
CPC ..... G06F 3/0481; G06F 3/048; H04L 67/131; H04L 67/10; A63F 13/22; A63F 13/25; A63F 13/537; A63F 13/92; A63F 13/98
See application file for complete search history.

(56) References Cited

U.S. PATENT DOCUMENTS

| 3,536,908 A | 10/1970 | Oster |
| 4,636,593 A | 1/1987 | Novak |

(Continued)

FOREIGN PATENT DOCUMENTS

| CA | 3169951 A1 | 9/2021 |
| CN | 101739162 A | 6/2010 |

(Continued)

OTHER PUBLICATIONS

US 12,029,974 B1, 07/2024, Maker (withdrawn)
(Continued)

*Primary Examiner* — Mahelet Shiberou
(74) *Attorney, Agent, or Firm* — Crowell & Moring LLP

(57) ABSTRACT
A controller can be used with a computing device to select and/or interact with content using user input devices on the controller. The content can be locally-stored on the computing device and/or streamed from a remote device. In one embodiment, a contextually-aware platform service switcher is provided. In another embodiment, a system and method for automatic content capability detection are provided. In yet another embodiment, a system and method for rich content browsing multitasking on device operating systems with multitasking limitations are provided. These embodiments can be used alone or in combination. Other embodiments are provided.

32 Claims, 23 Drawing Sheets

(51) Int. Cl.

| | |
|---|---|
| *A63F 13/25* | (2014.01) |
| *A63F 13/537* | (2014.01) |
| *A63F 13/92* | (2014.01) |
| *A63F 13/98* | (2014.01) |
| *G06F 3/048* | (2013.01) |
| *G06F 3/0481* | (2022.01) |
| *H04L 67/10* | (2022.01) |

(52) U.S. Cl.
CPC .............. *A63F 13/92* (2014.09); *A63F 13/98* (2014.09); *G06F 3/048* (2013.01); *G06F 3/0481* (2013.01); *H04L 67/10* (2013.01)

(56) References Cited

U.S. PATENT DOCUMENTS

| | | | |
|---|---|---|---|
| 6,213,880 | B1 | 4/2001 | Sim |
| 6,238,289 | B1 | 5/2001 | Sobota |
| 6,279,906 | B1 | 8/2001 | Sanderson |
| 6,400,352 | B1 | 6/2002 | Bruneau |
| 6,640,268 | B1 | 10/2003 | Kumar |
| 6,667,738 | B2 | 12/2003 | Murphy |
| 6,684,062 | B1 | 1/2004 | Gosior |
| 6,736,724 | B1 | 5/2004 | Erikawa |
| 6,761,462 | B2 | 7/2004 | Yoshida |
| D500,319 | S | 12/2004 | Wada |
| 6,855,057 | B2 | 2/2005 | Namba |
| 6,903,662 | B2 | 6/2005 | Rix |
| 6,965,368 | B1 | 11/2005 | Andrews et al. |
| 7,477,239 | B2 | 1/2009 | Ray |
| 7,580,728 | B2 | 8/2009 | Vance et al. |
| 7,905,627 | B2 | 3/2011 | Chiang |
| 8,368,662 | B2 | 2/2013 | Argiro |
| 8,462,810 | B2 | 6/2013 | Spinar |
| 8,558,796 | B2 | 10/2013 | Giancarlo |
| 8,568,238 | B2 | 10/2013 | Walker |
| 8,760,394 | B2 | 6/2014 | Chiang |
| 8,822,851 | B2 | 9/2014 | Walker |
| 8,972,617 | B2 | 3/2015 | Hirschman |
| 9,053,243 | B2 | 6/2015 | Townsend |
| 9,158,390 | B2 | 10/2015 | Petersen |
| 9,281,859 | B1 | 3/2016 | Lee |
| 9,295,915 | B2 | 3/2016 | Bruno |
| 9,677,740 | B2 | 6/2017 | Steiner |
| 9,700,800 | B2 | 7/2017 | Tokita |
| 9,848,324 | B1 | 12/2017 | Abene |
| 9,965,116 | B1 | 5/2018 | Wolter |
| 10,025,644 | B2 | 7/2018 | Iwaya et al. |
| 10,042,480 | B2 | 8/2018 | Krahenbuhl |
| 10,254,924 | B2 | 4/2019 | Missig |
| 10,258,876 | B2 | 4/2019 | Wells et al. |
| 10,259,384 | B2 | 4/2019 | Teng |
| 10,272,325 | B1 | 4/2019 | Nevarez |
| 10,300,386 | B1 | 5/2019 | Leung et al. |
| 10,391,393 | B2 | 8/2019 | Townley |
| 10,409,449 | B2 | 9/2019 | Takikawa |
| 10,483,969 | B2 | 11/2019 | Kontani |
| 10,599,233 | B1 | 3/2020 | Amalou |
| 10,725,557 | B2 | 7/2020 | Kontani |
| 10,741,215 | B1 | 8/2020 | Sundareson |
| 10,751,612 | B1 * | 8/2020 | Urbanus ............ H04N 21/4781 |
| 10,868,436 | B1 | 12/2020 | Chen |
| 10,893,125 | B2 * | 1/2021 | Ma ........................ H04L 67/141 |
| 10,912,991 | B2 | 2/2021 | Buhr |
| 11,000,759 | B2 | 5/2021 | Palmer et al. |
| 11,027,191 | B2 | 6/2021 | Oh |
| 11,045,723 | B1 | 6/2021 | Lee |
| 11,090,557 | B2 | 8/2021 | Downs et al. |
| 11,105,969 | B2 | 8/2021 | Sasagawa |
| 11,167,209 | B2 | 11/2021 | Lu |
| 11,298,614 | B2 | 4/2022 | Posin |
| 11,343,354 | B2 | 5/2022 | Parekh |
| 11,389,721 | B2 | 7/2022 | Khaira et al. |
| 11,395,961 | B2 | 7/2022 | Chung |
| 11,467,780 | B1 | 10/2022 | Perez Guevara |
| 11,528,363 | B2 | 12/2022 | Bohannon |
| 11,528,987 | B1 | 12/2022 | Girault |
| 11,534,681 | B2 | 12/2022 | Dang |
| 11,607,605 | B1 | 3/2023 | Garrett |
| 11,662,855 | B1 | 5/2023 | Sorensen et al. |
| 11,707,670 | B2 | 7/2023 | Khaira et al. |
| 11,819,756 | B2 | 11/2023 | Lu |
| 11,826,642 | B2 | 11/2023 | Khaira et al. |
| 11,839,810 | B2 | 12/2023 | Khaira et al. |
| 11,853,505 | B1 | 12/2023 | Sorensen et al. |
| 12,017,139 | B2 | 6/2024 | Vroom |
| 12,028,474 | B2 | 7/2024 | O'Leary |
| 12,064,699 | B2 | 8/2024 | Miura |
| 12,070,678 | B2 | 8/2024 | Maker |
| 12,074,946 | B2 | 8/2024 | Wei |
| 12,115,443 | B2 | 10/2024 | Khaira |
| 12,121,800 | B2 | 10/2024 | Maker |
| 12,145,052 | B2 | 11/2024 | Khaira |
| 12,145,053 | B2 | 11/2024 | Khaira |
| 12,194,374 | B2 | 1/2025 | Khaira |
| 12,263,400 | B2 | 4/2025 | Lake et al. |
| 12,268,956 | B2 | 4/2025 | Khaira |
| 12,274,933 | B2 | 4/2025 | Lu |
| 12,285,676 | B2 | 4/2025 | Maker |
| 12,303,775 | B2 | 5/2025 | Yeo |
| 12,324,983 | B2 | 6/2025 | O'Connor |
| 12,399,615 | B2 | 8/2025 | Peng |
| 12,420,178 | B2 | 9/2025 | Guerrero |
| 12,427,403 | B2 | 9/2025 | Boegli |
| 12,438,949 | B2 | 10/2025 | Donlan et al. |
| 12,551,785 | B2 | 2/2026 | O'Connor |
| 12,558,612 | B2 | 2/2026 | O'Connor |
| 2001/0027130 | A1 | 10/2001 | Namba |
| 2002/0173354 | A1 | 11/2002 | Winans |
| 2003/0235452 | A1 | 12/2003 | Kraus |
| 2004/0056781 | A1 | 3/2004 | Rix |
| 2004/0225502 | A1 | 11/2004 | Bear |
| 2005/0017953 | A1 | 1/2005 | Pekka |
| 2005/0170889 | A1 | 8/2005 | Lum |
| 2005/0172045 | A1 | 8/2005 | Bermudez et al. |
| 2005/0221894 | A1 | 10/2005 | Lum |
| 2005/0243585 | A1 | 11/2005 | Marchant |
| 2005/0247550 | A1 | 11/2005 | Hamada |
| 2006/0068911 | A1 | 3/2006 | Pirich |
| 2006/0080702 | A1 | 4/2006 | Diez |
| 2006/0132458 | A1 | 6/2006 | Garfio |
| 2006/0152628 | A1 * | 7/2006 | Park ................... H04N 21/4402 348/565 |
| 2006/0234794 | A1 | 10/2006 | Baseflug et al. |
| 2006/0236002 | A1 | 10/2006 | Valenci |
| 2006/0250351 | A1 | 11/2006 | Fu |
| 2006/0256090 | A1 | 11/2006 | Huppi |
| 2006/0286943 | A1 | 12/2006 | Vance |
| 2007/0010328 | A1 | 1/2007 | Yokota |
| 2007/0060363 | A1 | 3/2007 | Nguyen |
| 2007/0091633 | A1 | 4/2007 | Harrity |
| 2007/0152965 | A1 | 7/2007 | Krzyzanowski |
| 2007/0155511 | A1 | 7/2007 | Grundstedt |
| 2007/0233291 | A1 * | 10/2007 | Herde ................... G06Q 10/10 700/91 |
| 2007/0236959 | A1 | 10/2007 | Tolbert |
| 2008/0045338 | A1 | 2/2008 | Walker |
| 2008/0102960 | A1 | 5/2008 | Jiao |
| 2008/0202907 | A1 | 8/2008 | Kyowski |
| 2008/0261695 | A1 | 10/2008 | Coe |
| 2008/0294453 | A1 | 11/2008 | Baird-Smith |
| 2009/0065337 | A1 | 3/2009 | Chiang |
| 2009/0077277 | A1 | 3/2009 | Vidal |
| 2009/0219734 | A1 | 9/2009 | Sawada |
| 2009/0258713 | A1 | 10/2009 | Albouyeh |
| 2009/0284397 | A1 | 11/2009 | Lee |
| 2010/0026646 | A1 | 2/2010 | Xiao |
| 2010/0041480 | A1 | 2/2010 | Wong |
| 2010/0067424 | A1 | 3/2010 | Sun |
| 2010/0115050 | A1 | 5/2010 | Sultenfuss |
| 2010/0137033 | A1 | 6/2010 | Lee |
| 2010/0160048 | A1 | 6/2010 | Rabin |
| 2010/0259498 | A1 | 10/2010 | Harison |
| 2010/0271839 | A1 | 10/2010 | Chan |

(56) References Cited

U.S. PATENT DOCUMENTS

| 2011/0009195 A1 | 1/2011 | Porwal |
| 2011/0014984 A1 | 1/2011 | Penman et al. |
| 2011/0084904 A1 | 4/2011 | Tan |
| 2011/0241999 A1 | 10/2011 | Their |
| 2011/0252344 A1 | 10/2011 | Van Os |
| 2011/0256930 A1 | 10/2011 | Jaouen |
| 2011/0300934 A1 | 12/2011 | Toy |
| 2012/0007809 A1 | 1/2012 | Mahalingam |
| 2012/0145522 A1 | 6/2012 | Lee |
| 2012/0200475 A1 | 8/2012 | Baker |
| 2012/0220372 A1 | 8/2012 | Cheung |
| 2012/0225258 A1 | 9/2012 | Hill |
| 2012/0284302 A1 | 11/2012 | Takagi |
| 2013/0033829 A1 | 2/2013 | Furubo et al. |
| 2013/0053146 A1 | 2/2013 | Ikeda |
| 2013/0077346 A1 | 3/2013 | Chen |
| 2013/0079139 A1 | 3/2013 | Gray |
| 2013/0154958 A1 | 6/2013 | Clavin |
| 2013/0159928 A1 | 6/2013 | Joynes |
| 2013/0162680 A1 | 6/2013 | Perry |
| 2013/0165180 A1 | 6/2013 | Fukuda |
| 2013/0191625 A1 | 7/2013 | Mullens et al. |
| 2013/0222238 A1 | 8/2013 | Sliger |
| 2013/0225288 A1 | 8/2013 | Levin et al. |
| 2013/0237322 A1 | 9/2013 | Sobel |
| 2013/0249830 A1 | 9/2013 | Quek |
| 2013/0274018 A1 | 10/2013 | Zalewski |
| 2013/0298208 A1 | 11/2013 | Ayed |
| 2013/0303244 A1 | 11/2013 | Jensen |
| 2014/0018173 A1 | 1/2014 | Urhman |
| 2014/0024392 A1 | 1/2014 | Su |
| 2014/0109133 A1 | 4/2014 | Kitazato |
| 2014/0125619 A1 | 5/2014 | Panther et al. |
| 2014/0161417 A1 | 6/2014 | Kurupacheril |
| 2014/0184508 A1 | 7/2014 | Tamasi et al. |
| 2014/0206451 A1 | 7/2014 | Helmes |
| 2014/0274394 A1 | 9/2014 | Willis |
| 2014/0304494 A1 | 10/2014 | Hawver |
| 2014/0317329 A1 | 10/2014 | Barnett et al. |
| 2014/0365214 A1 | 12/2014 | Bayley |
| 2014/0375545 A1 | 12/2014 | Ackerman et al. |
| 2015/0018101 A1 | 1/2015 | Schoenith |
| 2015/0031452 A1 | 1/2015 | Rundell |
| 2015/0103015 A1 | 4/2015 | Berglund |
| 2015/0105152 A1 | 4/2015 | Bellinghausen |
| 2015/0128042 A1 | 5/2015 | Churchill et al. |
| 2015/0182856 A1 | 7/2015 | Mays, III |
| 2015/0185998 A1* | 7/2015 | Xing .................... G06F 3/0481 |
| | | 715/802 |
| 2015/0217191 A1 | 8/2015 | Yan |
| 2015/0231498 A1 | 8/2015 | Hain |
| 2015/0273325 A1 | 10/2015 | Falc et al. |
| 2015/0281422 A1 | 10/2015 | Kessler et al. |
| 2016/0062489 A1 | 3/2016 | Li |
| 2016/0089600 A1 | 3/2016 | Mays, III |
| 2016/0132114 A1 | 5/2016 | Rihn |
| 2016/0180811 A1 | 6/2016 | Colenbrander |
| 2016/0184712 A1 | 6/2016 | Colenbrander |
| 2016/0234264 A1* | 8/2016 | Coffman ............ H04L 65/4015 |
| 2016/0283063 A1 | 9/2016 | Missig |
| 2016/0313912 A1 | 10/2016 | Keam |
| 2016/0317919 A1 | 11/2016 | Gassoway et al. |
| 2016/0329533 A1 | 11/2016 | Tajima |
| 2016/0378226 A1 | 12/2016 | McCarthy, III |
| 2017/0056762 A1 | 3/2017 | Gafni |
| 2017/0072307 A1 | 3/2017 | Perry |
| 2017/0142201 A1 | 5/2017 | Holmes |
| 2017/0173461 A1 | 6/2017 | Pack |
| 2017/0189800 A1 | 7/2017 | Crain |
| 2017/0205881 A1 | 7/2017 | Yamashita |
| 2017/0239468 A1 | 8/2017 | Lemke |
| 2017/0239569 A1 | 8/2017 | Shiraiwa |
| 2017/0340957 A1 | 11/2017 | Cochenour |
| 2017/0354878 A1 | 12/2017 | Posin |
| 2017/0354884 A1 | 12/2017 | Benedetto |
| 2018/0001216 A1 | 1/2018 | Bruzzo |
| 2018/0004250 A1 | 1/2018 | Barnett et al. |
| 2018/0056176 A1 | 3/2018 | Sakamoto |
| 2018/0056180 A1 | 3/2018 | Russell |
| 2018/0070389 A1 | 3/2018 | Morgan |
| 2018/0097860 A1 | 4/2018 | Daly |
| 2018/0104574 A1 | 4/2018 | Tager |
| 2018/0121655 A1 | 5/2018 | Abene |
| 2018/0133594 A1 | 5/2018 | Guo |
| 2018/0217662 A1 | 8/2018 | Smoot |
| 2018/0250588 A1 | 9/2018 | Winick |
| 2018/0280802 A1 | 10/2018 | Stroud |
| 2018/0345136 A1 | 12/2018 | Schmitz et al. |
| 2018/0345139 A1 | 12/2018 | Smith |
| 2018/0359246 A1 | 12/2018 | Dannemiller et al. |
| 2018/0369692 A1 | 12/2018 | Winick |
| 2019/0079584 A1 | 3/2019 | Bonanno et al. |
| 2019/0080549 A1 | 3/2019 | Lewis |
| 2019/0134499 A1 | 5/2019 | Lee |
| 2019/0230400 A1 | 7/2019 | Van Os |
| 2019/0286817 A1 | 9/2019 | Butler |
| 2019/0354183 A1 | 11/2019 | Swindells |
| 2019/0358534 A1 | 11/2019 | Fang et al. |
| 2019/0379231 A1 | 12/2019 | Gonzalez et al. |
| 2020/0026387 A1 | 1/2020 | Barel |
| 2020/0155928 A1 | 5/2020 | Guo |
| 2020/0206636 A1 | 7/2020 | Schultz et al. |
| 2020/0238181 A1* | 7/2020 | Fang .................. H04N 21/4424 |
| 2020/0278758 A1 | 9/2020 | McAllen |
| 2020/0282309 A1 | 9/2020 | Liao |
| 2020/0298110 A1 | 9/2020 | Koziel |
| 2020/0316463 A1 | 10/2020 | Itay |
| 2020/0346121 A1 | 11/2020 | Beaumont |
| 2020/0353351 A1 | 11/2020 | Mao |
| 2020/0353369 A1 | 11/2020 | Esselstrom |
| 2020/0406140 A1 | 12/2020 | Sundareson |
| 2021/0093951 A1 | 4/2021 | Mahlmeister et al. |
| 2021/0104907 A1 | 4/2021 | Chen |
| 2021/0126984 A1 | 4/2021 | Parekh |
| 2021/0154584 A1 | 5/2021 | O'Connor et al. |
| 2021/0197082 A1 | 7/2021 | Seibert et al. |
| 2021/0200501 A1 | 7/2021 | Stankoulov |
| 2021/0205699 A1 | 7/2021 | Chung |
| 2021/0275907 A1 | 9/2021 | Khaira et al. |
| 2021/0291062 A1 | 9/2021 | Tulewicz |
| 2021/0299553 A1 | 9/2021 | Lu et al. |
| 2021/0308566 A1 | 10/2021 | Kong et al. |
| 2021/0326145 A1 | 10/2021 | Wu |
| 2021/0349586 A1 | 11/2021 | Tsuchikawa |
| 2022/0032178 A1 | 2/2022 | Khaira et al. |
| 2022/0032179 A1 | 2/2022 | Khaira et al. |
| 2022/0032180 A1 | 2/2022 | Khaira et al. |
| 2022/0039280 A1 | 2/2022 | Guerrero, Jr. |
| 2022/0040573 A1 | 2/2022 | Fear |
| 2022/0096921 A1 | 3/2022 | Nielsen |
| 2022/0096923 A1 | 3/2022 | O'Leary et al. |
| 2022/0135273 A1 | 5/2022 | Malone |
| 2022/0233950 A1 | 7/2022 | Larson |
| 2022/0272432 A1 | 8/2022 | Schillebeeckx |
| 2022/0317798 A1 | 10/2022 | Stryker |
| 2022/0323857 A1 | 10/2022 | Khaira et al. |
| 2022/0331688 A1 | 10/2022 | Khaira et al. |
| 2022/0339533 A1 | 10/2022 | Schoenith |
| 2022/0347563 A1 | 11/2022 | Khaira et al. |
| 2022/0347564 A1 | 11/2022 | Khaira et al. |
| 2022/0382559 A1 | 12/2022 | Tu et al. |
| 2022/0395754 A1 | 12/2022 | Ballard |
| 2022/0401834 A1 | 12/2022 | Benedetto |
| 2023/0048793 A1 | 2/2023 | Lee |
| 2023/0068209 A1 | 3/2023 | Han |
| 2023/0085053 A1 | 3/2023 | Young |
| 2023/0092439 A1 | 3/2023 | Dang |
| 2023/0105605 A1 | 4/2023 | Lu et al. |
| 2023/0136977 A1 | 5/2023 | Miura |
| 2023/0182011 A1 | 6/2023 | Vroom et al. |
| 2023/0211235 A1 | 7/2023 | Xu |
| 2023/0256330 A1 | 8/2023 | Lu et al. |
| 2023/0271082 A1 | 8/2023 | Khaira et al. |
| 2023/0356076 A1 | 11/2023 | Maker |

(56) References Cited

U.S. PATENT DOCUMENTS

| | | |
|---|---|---|
| 2023/0421696 A1 | 12/2023 | Bohannon |
| 2024/0009564 A1 | 1/2024 | Schembri |
| 2024/0042313 A1 | 2/2024 | Benedetto |
| 2024/0070218 A1 | 2/2024 | Gazit |
| 2024/0149148 A1 | 5/2024 | O'Connor |
| 2024/0149151 A1 | 5/2024 | Chow |
| 2024/0149163 A1 | 5/2024 | O'Connor |
| 2024/0149174 A1 | 5/2024 | Donlan |
| 2024/0155033 A1 | 5/2024 | Wei |
| 2024/0157258 A1 | 5/2024 | Maker |
| 2024/0176483 A1 | 5/2024 | Peng |
| 2024/0207721 A1 | 6/2024 | O'Connor |
| 2024/0207722 A1 | 6/2024 | Maker |
| 2024/0207723 A1 | 6/2024 | Maker |
| 2024/0207724 A1 | 6/2024 | O'Connor |
| 2024/0207725 A1 | 6/2024 | O'Connor |
| 2024/0207729 A1 | 6/2024 | McDole |
| 2024/0226721 A1 | 7/2024 | Lake et al. |
| 2024/0299844 A1 | 9/2024 | Vroom et al. |
| 2024/0307760 A1 | 9/2024 | Aldridge et al. |
| 2024/0325878 A1 | 10/2024 | Poitrey |
| 2024/0333804 A1 | 10/2024 | Wei et al. |
| 2024/0390786 A1 | 11/2024 | Aldridge et al. |
| 2025/0025773 A1 | 1/2025 | Maker |
| 2025/0025776 A1 | 1/2025 | Maker |
| 2025/0032900 A1 | 1/2025 | Khaira |
| 2025/0032901 A1 | 1/2025 | Boegli |
| 2025/0032903 A1 | 1/2025 | Khaira |
| 2025/0032904 A1 | 1/2025 | Khaira |
| 2025/0032913 A1 | 1/2025 | Abe |
| 2025/0041712 A1 | 2/2025 | Khaira |
| 2025/0058213 A1 | 2/2025 | Khaira et al. |
| 2025/0090945 A1 | 3/2025 | Koch et al. |
| 2025/0090946 A1 | 3/2025 | Koch et al. |
| 2025/0090947 A1 | 3/2025 | Khaira et al. |
| 2025/0099847 A1 | 3/2025 | Guerrero |
| 2025/0099848 A1 | 3/2025 | Yeo |
| 2025/0114691 A1 | 4/2025 | Poitrey |
| 2025/0128152 A1 | 4/2025 | Khaira et al. |
| 2025/0153035 A1 | 5/2025 | Torres et al. |
| 2025/0153045 A1 | 5/2025 | O'Connor et al. |
| 2025/0269271 A1 | 8/2025 | Lake et al. |
| 2025/0281827 A1 | 9/2025 | Maker |
| 2025/0352891 A1 | 11/2025 | Guerrero |

FOREIGN PATENT DOCUMENTS

| | | |
|---|---|---|
| CN | 204129699 U | 1/2015 |
| CN | 106356228 A | 1/2017 |
| CN | 107008005 A | 8/2017 |
| CN | 207532765 U | 6/2018 |
| CN | 207838250 U | 9/2018 |
| CN | 208115138 U | 11/2018 |
| CN | 109062842 A | 12/2018 |
| CN | 208636809 U | 3/2019 |
| CN | 209392718 U | 9/2019 |
| CN | 113426104 A | 9/2021 |
| CN | 115427123 A | 12/2022 |
| CN | 115427123 B | 2/2024 |
| EP | 1380324 A1 | 1/2004 |
| EP | 1380324 B1 | 9/2005 |
| EP | 2025369 A2 | 2/2009 |
| EP | 2136225 A1 | 12/2009 |
| EP | 2136225 B1 | 6/2012 |
| EP | 3224691 B1 | 4/2018 |
| EP | 3375502 A1 | 9/2018 |
| EP | 3782709 A1 | 2/2021 |
| EP | 4114540 A1 | 1/2023 |
| GB | 2608588 A | 1/2023 |
| JP | 2004139847 A | 5/2004 |
| JP | 2014210079 A | 11/2014 |
| JP | 2023516421 A | 4/2023 |
| TW | 201036020 A | 10/2010 |
| WO | WO2009/073819 | 6/2009 |
| WO | WO2015/072625 | 5/2015 |
| WO | WO2017/218303 | 12/2017 |
| WO | WO2021/102146 A1 | 5/2021 |
| WO | WO 2021/178242 A1 | 9/2021 |
| WO | WO2022/161834 A1 | 8/2022 |
| WO | WO 2023/034596 A1 | 3/2023 |
| WO | WO2023/172202 A1 | 9/2023 |
| WO | WO2024/006587 A1 | 1/2024 |
| WO | WO2024/097301 A1 | 5/2024 |
| WO | WO2024/107651 A1 | 5/2024 |
| WO | WO2024/107654 A1 | 5/2024 |
| WO | WO2024/137106 A1 | 6/2024 |
| WO | WO2024/148214 A1 | 7/2024 |
| WO | WO2024/248845 A1 | 12/2024 |
| WO | WO 2025/029566 A1 | 2/2025 |
| WO | WO2025/042684 A1 | 2/2025 |
| WO | WO2025/058942 A1 | 3/2025 |

OTHER PUBLICATIONS

US 12,047,455 B2, 07/2024, Wei et al. (withdrawn)

Notice of allowance in U.S. Appl. No. 17/856,895, dated Apr. 16, 2024.

Office Action in U.S. Appl. No. 18/405,077, dated May 7, 2024.

International Search Report and Written Opinion of the International Searching Authority issued in International Application No. PCT/US2024/010404, mailed Apr. 24, 2024 (16 pages).

U.S. Appl. No. 18/813,384, filed Aug. 2024, Maker.

U.S. Appl. No. 18/915,580, filed Oct. 2024, Khaira et al.

U.S. Appl. No. 18/915,648, filed Oct. 2024, Khaira et al.

U.S. Appl. No. 18/942,103, filed Nov. 2024, Scott et al.

U.S. Appl. No. 18/945,830, filed Nov. 2024, Khaira et al.

U.S. Appl. No. 18/962,755, filed Nov. 2024, Khaira et al.

U.S. Appl. No. 18/967,940, filed Dec. 2024, Khaira et al.

Notice of allowance in U.S. Appl. No. 17/504,260, dated Dec. 9, 2024.

Notice of allowance in U.S. Appl. No. 18/405,077, dated Dec. 12, 2024.

Office Action in U.S. Appl. No. 18/076,172, dated Dec. 2, 2024.

International Search Report and Written Opinion of the International Searching Authority issued in International Application No. PCT/US2024/039193, mailed Nov. 11, 2024 (16 pages).

International Search Report and Written Opinion of the International Searching Authority issued in International Application No. PCT/US2024/039487, mailed Nov. 18, 2024 (20 pages).

International Search Report and Written Opinion of the International Searching Authority issued in International Application No. PCT/US2024/042461, mailed Nov. 12, 2024 (13 pages).

Anonymous: "Chamfer", Wikipedia, Nov. 14, 2022 (Nov. 14, 2022), pp. 1-5, XP093219692, Retrieved from the Inernet: URL:https://en.wikipedia.org/w/index.php?title=Chamfer&oldid=1121832130 p. 3, 5 pages.

Anonymous: "Remote Play", Wikipedia, dated Jun. 30, 2023, XP093217737, Retrieved from the Internet: URL:https://en.wikipedia.org/w/index.php?title=Remote_Play&oldid=1162598770, 9 pages.

ROG Tessen Mobile Controller, Transform Your Game, Republic of Gamers, obtained from the Internet on Dec. 16, 2024, URL: https://rog.asus.com/controllers/rog-tessen-mobile-controller/, 7 pages.

U.S. Appl. No. 18/734,411, filed Jun. 2024, Maker.

U.S. Appl. No. 18/777,919, filed Jul. 2024, Khaira et al.

U.S. Appl. No. 18/805,902, filed Aug. 2024, Khaira et al.

Notice of allowance in U.S. Appl. No. 17/504,283, dated Sep. 10, 2024.

Notice of allowance in U.S. Appl. No. 17/504,299, dateed Sep. 10, 2024.

Notice of allowance in U.S. Appl. No. 17/856,895, dated Aug. 28, 2024.

Notice of allowance in U.S. Appl. No. 18/195,152, dated Aug. 30, 2024.

Notice of allowance in U.S. Appl. No. 18/224,508, dated Aug. 29, 2024.

Office Action in U.S. Appl. No. 18/405,077, dated Sep. 11, 2024.

Office Action in U.S. Appl. No. 17/504,260, dated Jul. 23, 2024.

(56)         References Cited

OTHER PUBLICATIONS

International Search Report and Written Opinion of the International Searching Authority issued in International Application No. PCT/US2024/019901, mailed Jul. 17, 2024 (15 pages).
Anonymous: "Using the wireless controller", Playstation 4 User's Guide, Mar. 15, 2023 (Mar. 15, 2023), pp. 1-3, XP093178521, Retrieved from the Internet: URL:https://web.archive.org/web/20230315012624/https://manuals.playstation.net/document/en/ps4/basic/usercontroller.html [retrieved on Jun. 5, 2024] the whole document, 3 pages.
Office Action, Advisory Action, in U.S. Appl. No. 17/504,260, dated Nov. 14, 2024.
Walmart.com; search, obtained from the Internet on Nov. 17, 2024; URL: https://www.walmart.com/search?q=for+Apple+MagSafe+Charger%2C+Wireless+Charger+with+Fast+Charging+Capability%2C+Type+C+Wall+Charger%2C+Compatible+for+iPhone+and+AirPods; 3 pages.
M-Con; obtained from the Internet on Nov. 17, 2024; URL: https://www.m-con.co/; 6 pages.
U.S. Appl. No. 17/866,166, filed Jul. 15, 2022 entitled "Game Controller for a Mobile Device with Flat Flex Connector.".
U.S. Appl. No. 17/866,234, filed Jul. 15, 2022 entitled "Game Controller for a Mobile Device with Extended Bumper Button.".
"Picture-in-picture (PiP) suppor"; Android Developers UI Guide; downloaded from the Internet on Nov. 27, 2022 at https://developer.android.com/develop/ui/views/picture-in-picture; Nov. 11, 2022; 10 pages.
"AVPictureInPictureController: A controller that responds to user-initiated Picture in Picture playback of video in a floating, resizable window"; Apple Developer Documentation, AVKit; downloaded from the Internet on Nov. 27, 2022 at https://developer.apple.com/documentationa/avkit/avpictureinpicturecontroller; Apple Inc.; 2022; 8 pages.
"GitHub—Kofktu/PIPKit: Picture in Picture for iOS"; downloaded from the Internet on Nov. 27, 2022 at https://github.com/Kofktu/PIPKit; GitHub, Inc.; 2022; 11 pages.
"Picture-in-Picture API—Web APIs / MDN"; downloaded from the Internet on Nov. 27, 2022 at https://developer.mozilla.org/en-US/docs/Web/API/Picture-in-Picture_API; Mozzilla Corporation; Oct. 10, 2022; 4 pages.
"How to implement Picture in Picture Webview on IOS Swift?"; StackOverflow Questions; downloaded from the Internet on Nov. 28, 2022 at https://stackoverflow.com/questions/69565199/how-to-implement-picture-in-picture-webview-on-ios-swift; StackOverflow; Oct. 14, 2021; 2 pages.
Osterber, J.; "Picture in Picture Across All Platforms"; Kodeco / iOS & Swift Tutorials; downloaded from the Internet on Nov. 28, 2022 at https://www.kodeco.com/24247382-picture-in-picture-across-all-platforms; Jul. 26, 2021; 14 pages.
"Displaying live data with Live Activities"; Apple Devleoper Documentation Activity Kit article; downloaded from the Internet on Nov. 28, 2022 at https://developer.apple.com/doumentation/activitykit/displaying-live-data-with-live-activites; Apple Inc.; 2022; 37 pages.
"User Notifications: Push user-facing notifications to the user's device from a server, or generate them locally from your app"; Apple Developer Documentation; downloaded from the Internet on Nov. 28, 2022 at https://developer.apple.com/documentation/usernotifications; 2022; 16 pages.
"Gamepass App now supports Picture in Picture"; Reddit, xcloud comments; downloaded from the Internet on Nov. 28, 2022 at https://www.reddit.com/r/xcloud/comments/mvathi/gamepass_app_now_supports_picture_in_picture/; Reddit Inc.; 2022; 6 pages.
"Pip (picture in picture) moded on android with the xbox game pass beta app"; Reddit, XboxGamePass comments; downloaded from the Internet on Nov. 29, 2022 at https://www.reddit.com/r/XboxGamePass/comments/n7f5bk/pip_picture_in_picture_mode_on_android_with_the/; Reddit Inc.; 2022; 6 pages.

"Backbone—Next-Level Play"; Apple App Store preview; downloaded from the Internet on Nov. 29, 2022 at https://apps.apple.com/us/app/backbone-next-level-play/id1449660663; Apple Inc.; 2022; 4 pages.
Faulkner, C.; "The Backbone One is a stunning controller that turns you iPhone into a more capable gaming device"; The Verge, entertainment tech review webpage; downloaed from the Internet on Nov. 29, 2022 at https://www.theverge.com/21525741/backbone-one-iphone-ios-controller-gaming-portable-review; Vox Media LLC; Apr. 27, 2021; 12 pages.
Faulkner, C.; "Backbone's excellent phone controller is now shipping for Android" The Verge, entertainment tech review webpage; downloaed from the Internet on Nov. 29, 2022 at https://www.theverge.com/2022/11/16/23462127/backbone-one-phone-controller-android-usb-c-features; Vox Media LLC; Nov. 16, 2022; 20 pages.
Adler, M.; "Backbone One Review: Mobile gaming reenvisioned"; IGN review; downloaed from the Internet on Nov. 29, 2022 at https://www.ign.com/articles/backbone-one-review; IGN; Nov. 7, 2021; 18 pages.
Max Tech; Backbone One Review—The Best iPhone Gaming Controller!; YouTube product review video; downloaed from the Internet on Nov. 29, 2022 at https://www.youtube.com/watch?v=zRJQjt2nzDo; YouTube; Jun. 2022; 4 pages.
"Game Center"; Apple Developer Game Center overview; downloaed from the Internet on Nov. 29, 2022 at https://developer.apple.com/game-center/; Apple Inc.; 2022; 4 pages.
Voorhees, J.; "Deeper Controller Support and a Revitalized Game Center: Exploring Apple's 2020 Gaming Updates"; MacStories Weekly Extras; downloaed from the Internet on Nov. 29, 2022 at https://www.macstories.net/stories/deeper-controller-MacStories, Inc.; Aug. 27, 2020; 14 pages.
Schofield, T.; "Logitech G Cloud Unboxing and Hands On!"; YouTube product review video; downloaed from the Internet on Nov. 29, 2022 at https://www.youtube.com/watch?v=speoPL5vqX0; YouTube; Nov. 2022; 3 pages.
Tech & Design; "How to Set Up New Nintendo Switch | Beginners Guide | First Time Turning On"; YouTube product review video; downloaed from the Internet on Nov. 29, 2022 at https://www.youtube.com/watch?v=XtMcQ9IAkCc; YouTube; 2021; 4 pages.
Box.co.uk; "How Does the Samsung Gaming Hub Work?"; YouTube product tutorial; downloaed from the Internet on Nov. 29, 2022 at https://www.youtube.com/watch?v=uAT4tZR3mNk; YouTube; Oct. 2022; 5 pages.
Office Action in U.S. Appl. No. 17/856,895, dated Mar. 12, 2024.
International Search Report and Written Opinion of the International Searching Authority issued in International Application No. PCT/US2023/036609, mailed Feb. 12, 2024 (15 pages).
International Search Report and Written Opinion of the International Searching Authority issued in International Application No. PCT/US2023/079518, mailed Feb. 9, 2024 (12 pages).
Notice of allowance in U.S. Appl. No. 17/504,283, dated May 29, 2024.
Notice of allowance in U.S. Appl. No. 17/504,299, dated Jun. 12, 2024.
Notice of allowance in U.S. Appl. No. 17/856,865, dated Jun. 12, 2024.
Notice of allowance in U.S. Appl. No. 18/076,146, dated Jun. 13, 2024.
Notice of allowance in U.S. Appl. No. 18/086,103, dated May 28, 2024.
International Search Report and Written Opinion of the International Searching Authority issued in International Application No. PCT/US2023/079521, mailed May 24, 2024 (15 pages).
U.S. Appl. No. 16/693,080 filed, Nov. 2019, O'Connor.
U.S. Appl. No. 16/808,339, filed Mar. 2020, Khaira et al.
U.S. Appl. No. 17/504,260, filed Oct. 2021, Khaira.
U.S. Appl. No. 17/504,283, filed Oct. 2021, Khaira et al.
U.S. Appl. No. 17/504,299, filed Oct. 2021, Khaira.
U.S. Appl. No. 17/850,912, filed Jul. 2022, Khaira.
U.S. Appl. No. 17/856,895, filed Jul. 2022, Khaira.
U.S. Appl. No. 17/987,772, filed Nov. 2022, Sorensen.
U.S. Appl. No. 18/086,077, filed Dec. 2022, Maker.
U.S. Appl. No. 18/086,103, filed Dec. 2022, Maker.

(56) References Cited

OTHER PUBLICATIONS

U.S. Appl. No. 18/138,377, filed Apr. 2023, Sorensen et al.
U.S. Appl. No. 18/195,152, filed May 2023, Khaira.
U.S. Appl. No. 18/224,508, filed Jul. 2023, Maker.
U.S. Appl. No. 18/237,680, filed Aug. 2023, O'Connor.
U.S. Appl. No. 18/237,698, filed Aug. 2023, O'Connor.
U.S. Appl. No. 18/242,672, filed Sep. 2023, Aldridge et al.
U.S. Appl. No. 18/369,000, filed Sep. 2023, Koch et al.
U.S. Appl. No. 18/369,025, filed Sep. 2023, Koch et al.
U.S. Appl. No. 18/388,631, filed Nov. 2023, Khaira et al.
U.S. Appl. No. 18/388,636, filed Nov. 2023, Khaira et al.
U.S. Appl. No. 18/388,922, filed Nov. 2023, O'Connor et al.
U.S. Appl. No. 18/389,063, filed Nov. 2023, Maker et al.
U.S. Appl. No. 18/405,077, filed Jan. 2024, Lake et al.
U.S. Appl. No. 63/422,797, filed Nov. 2022, Khaira et al.
U.S. Appl. No. 63/425,655, filed Nov. 2022, Maker et al.
U.S. Appl. No. 63/435,089, filed Dec. 2022, O'Connor.
U.S. Appl. No. 63/437,580, filed Jan. 2023, Lake et al.
U.S. Appl. No. 63/452,551, filed Mar. 2023, Aldridge et al.
U.S. Appl. No. 63/524,014, filed Jun. 2023, O'Connor.
U.S. Appl. No. 63/530,230, filed Aug. 2023, Khaira et al.
U.S. Appl. No. 63/533,580, filed Aug. 2023, Khaira et al.
Office Action in CN Application No. 202180019131.2, dated Jul. 7, 2023.
Office Action in CN Application No. 202180019131.2, dated Mar. 28, 2023.
Office Action—Communication pursuant to Rules 161(1) and 162 EPC, dated Oct. 26, 2022.
Notice of allowance in U.S. Appl. No. 18/224,508, dated Jan. 24, 2024.
Office Action in U.S. Appl. No. 16/693,080, dated Jan. 24, 2024.
Office Action in U.S. Appl. No. 16/693,080, dated Jun. 8, 2021.
Office Action in U.S. Appl. No. 17/504,283, dated Feb. 13, 2024.
Office Action in U.S. Appl. No. 17/856,895, dated Jul. 18, 2023.
Office Action in U.S. Appl. No. 17/856,895, dated Nov. 1, 2023.
Office Action in U.S. Appl. No. 17/856,895, dated Oct. 27, 2022.
Office Action in U.S. Appl. No. 18/076,146, dated Dec. 12, 2023.
Office Action in U.S. Appl. No. 18/086,077, dated Apr. 17, 2023.
Office Action in U.S. Appl. No. 18/086,077, dated Aug. 17, 2023.
Office Action in U.S. Appl. No. 18/086,103, dated Dec. 7, 2023.
Office Action in U.S. Appl. No. 18/195,152, dated Aug. 4, 2023.
Office Action in U.S. Appl. No. 18/224,508, dated Oct. 3, 2023.
International Search Report and Written Opinion of the International Searching Authority issued in International Application No. PCT/US2023/031919, mailed Nov. 17, 2023 (14 pages).
International Search Report and Written Opinion of the International Searching Authority issued in International Application No. PCT/US2020/061291, mailed Feb. 24, 2021, 20 pages.
Dickinson, "Instant Replay: Building a Game Engine with Reproducible Behavior," Jul. 13, 2001, Retrieved from the Internet: URL: http://www.gamasutra.com/features/20010713/dickinson_01.htm [retrieved on Oct. 2, 2007], 6 pages.
Vinyals et al., "Grandmaster level in StarCraft II using multi-agent reinforcement learning," Nature, Macmillan Journals Ltd., London, vol. 575, No. 7782, Oct. 30, 2019, pp. 350-354, 22 pages.
Wagner, "Developing Your Own Replay System," Feb. 4, 2004, Retrieved from the Internet: URL: http://www.Jamasutra.com/features/200402004/wagner_01.shtml [retrieved on Oct. 9, 2007], 11 pages.
U.S. Appl. No. 18/076,121, filed Dec. 6, 2022 entitles "Contextually-Aware Platform Service Switcher.".
U.S. Appl. No. 18/076,146, filed Dec. 6, 2022 entitled "System and Method for Automatic Content Capability Detection.".
U.S. Appl. No. 18/136,509, filed Apr. 19, 2023 entitled "Universal Mobile Game Controller.".
U.S. Appl. No. 18/214,917, filed Jun. 27, 2023 entitled "Game Controller with Play-on-Any-Screen Feature.".
U.S. Appl. No. 18/214,949, filed Jun. 27, 2023 entitled "Software-Enabled Mobile Game Controller with Integrated Platform Operating Service.".

U.S. Appl. No. 18/202,755, filed May 26, 2023 entitled "Cloud Game Queueing.".
U.S. Appl. No. 18/226,883, filed Jul. 27, 2023 entitled "Platform-Customized Mobile Game Controller and Methods for Use Therewith.".
U.S. Appl. No. 18/226,892, filed Jul. 27, 2023 entitled "Mobile Game Controller and Method for Connecting to a Wireless Audio Device.".
"Backbone One"; Mobile gaming hardware product page; Backbone; Dec. 9, 2022; 7 pages.
"Digital Depth: All Controller Universal & Fully Customizable"; Kickstarter project page for customizable game controller; Digital Depth Inc.; Aug. 4, 2021; 25 pages.
"PhoneJoy Play: Turn your phone into a console!"; Kickstarter project page for compact gamepad; Phonejoy Solutions America, Inc.; Jul. 29, 2014; 42 pages.
"Why queue in geforce now so long? I try to answer for this question" Reddit, GeForceNOW comments; downloaded from the Internet on Jun. 7, 2023 at why queue in geforce now so long? I try to answer for this question : r/GeForceNOW (reddit.com); Reddit Inc.; Jun. 1, 2023; 6 pages.
Hinton, L.; "Xbox Cloud Gaming 'Lots of people are playing' Fix: Why is queue taking so long? and How to fix Xbox Cloud Gaming 'Lots of people are playing' error"; downloaded from the Internet on Jun. 7, 2023 at Xbox Cloud Gaming 'Lots of people are playing' Fix: Why is queue taking so long?—GameRevolution; Game Revolution; Dec. 13, 2021; 6 pages.
Sholtz, M.; "The Razer Kishi V2 offers a new Virtual Controller mode, and it's pretty slick"; Android Police Newsletter article; downloaded from the Internet on Aug. 16, 2023 at The Razer Kishi V2 offers a new Virtual Controller mode, and it's pretty slick (androidpolice.com); Jan. 21, 2023; 7 pages.
"Rayz Pro"; Pioneer Rayz™ Pro earbuds product page; downloaded from the Internet on Aug. 16, 2023 at Rayz Pro Earphone—Pioneer Rayz; Pioneer Rayz; 2023; 9 pages.
Intenational Search Report and Written Opinion of the International Searching Authority issued in International Application No. PCT/US2021/019941, mailed Jun. 9, 2021 (11 pages).
U.S. Appl. No. 18/746,611 filed Jun. 2024, Ivan Torres.
U.S. Appl. No. 18/739,527 filed Jun. 2024, Hong Tai Wei.
Notice of allowance in U.S. Appl. No. 18/076,146, dated Jul. 22, 2024.
Notice of allowance in U.S. Appl. No. 18/086,103, dated Jul. 9, 2024.
Notice of allowance in U.S. Appl. No. 18/195,152, dated Jul. 23, 2024.
Notice of allowance in U.S. Appl. No. 18/224,508, dated Jun. 21, 2024.
Notice of allowance in U.S. Appl. No. 17/504,299, dated Apr. 15, 2024.
Notice of allowance in U.S. Appl. No. 18/076,146, dated Apr. 15, 2024.
Notice of allowance in U.S. Appl. No. 18/086,103, dated Mar. 25, 2024.
Notice of allowance in U.S. Appl. No. 18/086,103, dated Apr. 3, 2024.
Office Action in U.S. Appl. No. 17/504,260, dated Mar. 21, 2024.
Office Action in U.S. Appl. No. 17/504,299, dated Mar. 22, 2024.
Office Action in U.S. Appl. No. 18/195,152, dated Mar. 26, 2024.
International Search Report and Written Opinion of the International Searching Authority issued in International Application No. PCT/US2023/036567, mailed Mar. 11, 2024 (18 pages).
International Search Report and Written Opinion of the International Searching Authority issued in International Application No. PCT/US2023/081101, mailed Mar. 11, 2024 (19 pages).
Bluetooth Special Interest Group: "Bluetooth Human Interface Device (HID) Profile Specifications", Bluetooth Adopted Specification Web page, Feb. 21, 2012 (Feb. 21, 2012), pp. 1-123, XP055133797, Retrieved from the Internet: URL:https://www.bluetooth.org/en-us/specification/adopted-specifications [retrieved on Aug. 7, 2017].

(56)         References Cited

OTHER PUBLICATIONS

Retro Game Corps, "This Controller Could Change Mobile Gaming" (youtube.com), Oct. 3, 2024, obtained from the Internet on Oct. 10, 2024; URL: https://www.youtube.com/watch?v=J3969hkkFSE, 21 pages.
GameSir G8 Plus Bluetooth Mobile Controller—Big Enough as You Want—GameSir Official Store, obtained from the Internet on Oct. 10, 2024; URL: https://www.gamesir.hk/blogs/news/gamesir-g8-plus-bluetooth-mobile-controller-big-enough-as-you-want, 8 pages.
Kyle Bradshaw, GameSir G8 Galileo Review: The mobile controller I've dreamed of (9to5google.com), obtained from the Internet on Oct. 10, 2024; URL: https://9to5google.com/2024/01/25/review-gamesir-g8-galileo-android-ios/, 12 pages.
Nintendo Switch—Nintendo—Official Site, obtained from the Internet on Oct. 10, 2024; URL: https://www.nintendo.com/us/switch/system/, 17 pages.
Nintendo switch internal—Search Images (bing.com), obtained from the Internet on Oct. 10, 2024; URL: https://www.bing.com/images/search?view=detailV2&ccid=87gF12WI&id=31A64F955C01D87035FBF76FC2B1082808CDF4C2&thid=OIP.87gF12WIjRYTL2hDhEBZtQAAAA&mediaurl=https%3a%2f%2fwww.allaboutcircuits.com%2fuploads%2farticles%2fMouser_IA_Switch_figure5.jpg&cdnurl=https%3a%3f%2fth.bing.com%2fth%2fid%2fR.f3b8b05d765888d16132f6843844059b5%3frik%3dwvTNCCglscJv9w%26pid%3dImgRaw%26r%3d0&exph=355&expw=474&q=ninetnedo+switch+internal&simid=608038160133663134&FORM=IRPRST&ck=C6F7BED9A8A0BA549A06B2B38B157AFA&selectedIndex=&itb=0&ajaxhist=0&ajaxserp=0, 4 pages.
U.S. Appl. No. 19/013,753, filed Jan. 2025, Khaira.
U.S. Appl. No. 63/743,503, filed Jan. 2025, Khaira.
Notice of allowance in U.S. Appl. No. 18/405,077, dated Dec. 26, 2024.
Notice of allowance in U.S. Appl. No. 18/405,077, dated Jan. 13, 2025.
Notice of allowance in U.S. Appl. No. 18/734,411 dated Jan. 13, 2025.
Office Action in U.S. Appl. No. 18/076,172, dated Jan. 10, 2025.
International Preliminary Reporty on Patentability in International Application No. PCT/US2023/031919, mailed Jan. 16, 2025.
U.S. Appl. No. 63/770,124, filed Mar. 2025, Khaira.
U.S. Appl. No. 63/781,523, filed Apr. 2025, Khaira.
Office Action in U.S. Appl. No. 18/086,077, dated Mar. 14, 2025.
Office Action in U.S. Appl. No. 18/136,509, dated Apr. 1, 2025.
Jovanee, Alice, The new 8Bitdo Ultimate controller comes in Oct., https://www.theverge.com/2022/8/30/23326887/8bitdo-ulti mate-pro-control ler-bluetooth-preorder-nintendo-switch-wireless, Aug. 30, 2022 (Year: 2022), 3 pages.
Lon.tv, GameSir X2 USB-C Android Game Controller Review (Newest Version), https://www.youtube.com/watch?v=9Kzytm8D6qk, Nov. 24, 2021 (Year: 2021), 8 pages.
U.S. Appl. No. 19/068,177, filed Mar. 2025, Lake et al.
U.S. Appl. No. 19/096,915, filed Apr. 2025, Maker.
Office Action—Communication pursuant to Rules 161(1) and 162 EPC in Europe Application No. 23817600.2, dated Jun. 12, 2025.
Notice of allowance in U.S. Appl. No. 18/076,121, dated Jun. 23, 2025.
Notice of allowance in U.S. Appl. No. 18/136,509 dated Apr. 24, 2025.
Office Action in U.S. Appl. No. 18/076,121, dated Apr. 16, 2025.
Office Action in U.S. Appl. No. 18/076,172, dated May 12, 2025.
Office Action in U.S. Appl. No. 18/202,755, dated May 7, 2025.
Office Action in U.S. Appl. No. 18/226,883, dated Jun. 6, 2025.
Office Action in U.S. Appl. No. 18/226,892, dated Jun. 2, 2025.
International Preliminary Report on Patentability in International Application No. PCT/US2023/036609, mailed May 15, 2025.
International Preliminary Report on Patentability in International Application No. PCT/US2023/079518 mailed May 22, 2025.
International Preliminary Report on Patentability in International Application No. PCT/US2023/079521 mailed May 22, 2025.

International Preliminary Report on Patentability in International Application No. PCT/US2023/081101, mailed Jul. 3, 2025.
International Preliminary Report on Patentability in International Application No. PCT/US2024/010404, mailed Jul. 17, 2025.
International Search Report and Written Opinion of the International Searching Authority issued in International Application No. PCT/US2024/045554, mailed Dec. 12, 2024.
U.S. Appl. No. 19/068,177, entitled: "Open and Close Features for Game Controller Bridge", first named inventor: Jon Christopher Lake, filed Mar. 3, 2025.
U.S. Appl. No. 19/096,915, entitled: "Dynamically Changing Button Indicia for a Game Controller", first named inventor: Ozhan Maker, filed Apr. 1, 2025.
U.S. Appl. No. 19/318,687, entitled: "Contextually-Aware Platform Service Switcher", first named inventor: Joshua Donlan, filed Sep. 4, 2025.
U.S. Appl. No. 19/321,509, entitled: "Mobile Game Controller and Method for Connecting to a Wireless Audio Device", first named inventor: Samuel Boegli, filed Sep. 8, 2025.
U.S. Appl. No. 19/454,716, entitled: "Universal Mobile Game Controller", first named inventor: Shawn O'Connor, filed Jan. 21, 2026.
U.S. Appl. No. 19/454,733, entitled: "Universal Mobile Game Controller", first named inventor: Shawn O'Connor, filed Jan. 21, 2026.
Notice of allowance in U.S. Appl. No. 18/226,892, dated Aug. 29, 2025.
Notice of allowance in U.S. Appl. No. 18/237,680, dated Nov. 3, 2025.
Notice of allowance in U.S. Appl. No. 18/237,698, dated Oct. 22, 2025.
Office Action in U.S. Appl. No. 18/076,172, dated Sep. 2, 2025.
Office Action in U.S. Appl. No. 18/202,755, dated Oct. 23, 2025.
Office Action in U.S. Appl. No. 18/214,949, dated Mar. 9, 2026.
Office Action in U.S. Appl. No. 18/226,883, dated Dec. 1, 2025.
Office Action in U.S. Appl. No. 18/237,680, dated Aug. 7, 2025.
Office Action in U.S. Appl. No. 18/242,672, dated Oct. 27, 2025.
Office Action in U.S. Appl. No. 18/369,000, dated Jan. 22, 2026.
Office Action in U.S. Appl. No. 18/388,922, dated Sep. 30, 2025.
Office Action in U.S. Appl. No. 18/389,063, dated Mar. 20, 2026.
Office Action in U.S. Appl. No. 18/805,902, dated Mar. 26, 2026.
Office Action, Restriction Requirement, in U.S. Appl. No. 18/214,917, dated Dec. 30, 2025.
Office Action, Restriction Requirement, in U.S. Appl. No. 18/369,025, dated Mar. 9, 2026.
Office Action, Restriction Requirement, in U.S. Appl. No. 18/389,063, dated Oct. 27, 2025.
Office Action, Restriction Requirement, in U.S. Appl. No. 18/739,527, dated Dec. 31, 2025.
Office Action, Restriction Requirement, in U.S. Appl. No. 18/777,919, dated Mar. 25, 2026.
Joe Skrebels, Cyberpunk 2077 Xbox Controller Contains a Neat Easter Egg, Jul. 4, 2022, https://web.archive.org/web/20220704064405/https:/www.ign.com/articles/cyberpunk-2077-controller-soundtrack-qr-code-arg , pp. 1-2 (Year: 2022).
Lauryn Strampe, Review: Backbone One, Oct. 28, 2021, https://web.archive.org/web/20211028155054/https:/www.wired.com/review/backbone-one-iphone-controller/, pp. 1-8 (Year: 2021).
Lon, Tv, Backbone One Game Controller for iPhone Review, Jul. 7, 2021, https://www.youtube.com/watch?v=fv8qba1 niug , time 0:00-12:00, p. 1 (Year: 2021).
Luis Alamilla, TH IS Changes PS5 and XBOX Remote Play I Backbone One Controller Review, May 27, 2021, https://www.youtube.com/watch?v=tJrDhvy2Ffg, time 0:00-4:24, p. 1, (Year: 2021).
Peter Likes Photography and Cosplay, Backbone One iOS Review—Steam Link, PS Remote Play, and Xcloud tested, Oct. 17, 2021, https://www.youtube.com/watch?v=f3FfgXogToc, time 0:00-10:30, p. 1 (Year: 2021).
Reviews 2 Go, Control: Ulitmate Edition—Cloud Version (Switch) Review, Nov. 2, 2020, https://www.youtube.com/watch?v=OeANrOtSSpw, time 0:00-8:54, p. 1 (Year: 2020).

(56)     References Cited

OTHER PUBLICATIONS

Saunderverse, How to close out of a game/app on Nintendo Switch OLEO, Oct. 9, 2021, https://www.youtube.com/watch?v=9KZBfjUYiPg, time 0:00-0:48, p. 1 (Year: 2021).

Tech Tips, Nintendo Switch: How to Close a Game, Dec. 4, 2021, https://www.youtube.com/watch?v=m5FoRvN_5pM , time 0:00-1:01, p. 1 (Year: 2021).

Wesley Hilliard, Backbone One i Phone controller users get new features with optional subscription, Nov. 4, 2021, https://web.archive.org/web/20211104170551/https:/appleinsider.com/articles/21/11/04/backbone-one-iphone-controller-users-get-new-features-with-optional-subscription , pp. 1-4 (Year: 2021).

* cited by examiner

510

500

User Interaction to operate the content browser within the platform operating system

FIG. 19

SYSTEM AND METHOD FOR RICH CONTENT BROWSING MULTITASKING ON DEVICE OPERATING SYSTEMS WITH MULTITASKING LIMITATIONS

CROSS-REFERENCE TO RELATED APPLICATION

This application claims the benefit of U.S. provisional patent application No. 63/422,797, filed Nov. 4, 2022, which is hereby incorporated by reference.

BACKGROUND

A controller can be used with a computing device to select and/or interact with content using user input devices on the controller. The content can be locally-stored on the computing device and/or streamed from a remote device. For example, the controller can be a game controller used to play a game that is native to the computing device and/or to play a game that is streamed from a remote server to a browser of the computing device.

BRIEF DESCRIPTION OF THE DRAWINGS

Figure 19:
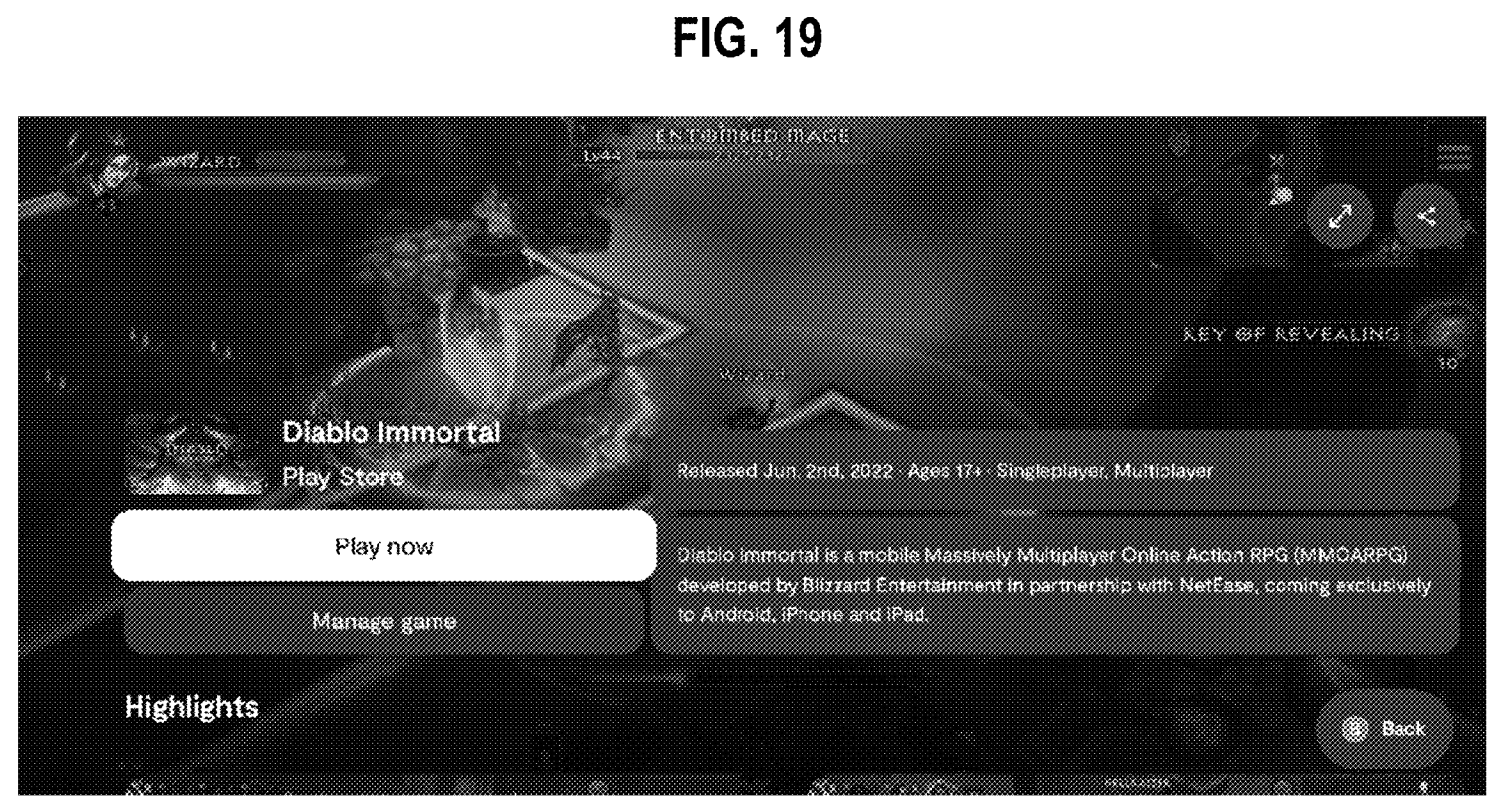

FIGS. 18-24 are screenshots of embodiments.

SUMMARY

Figure 1:
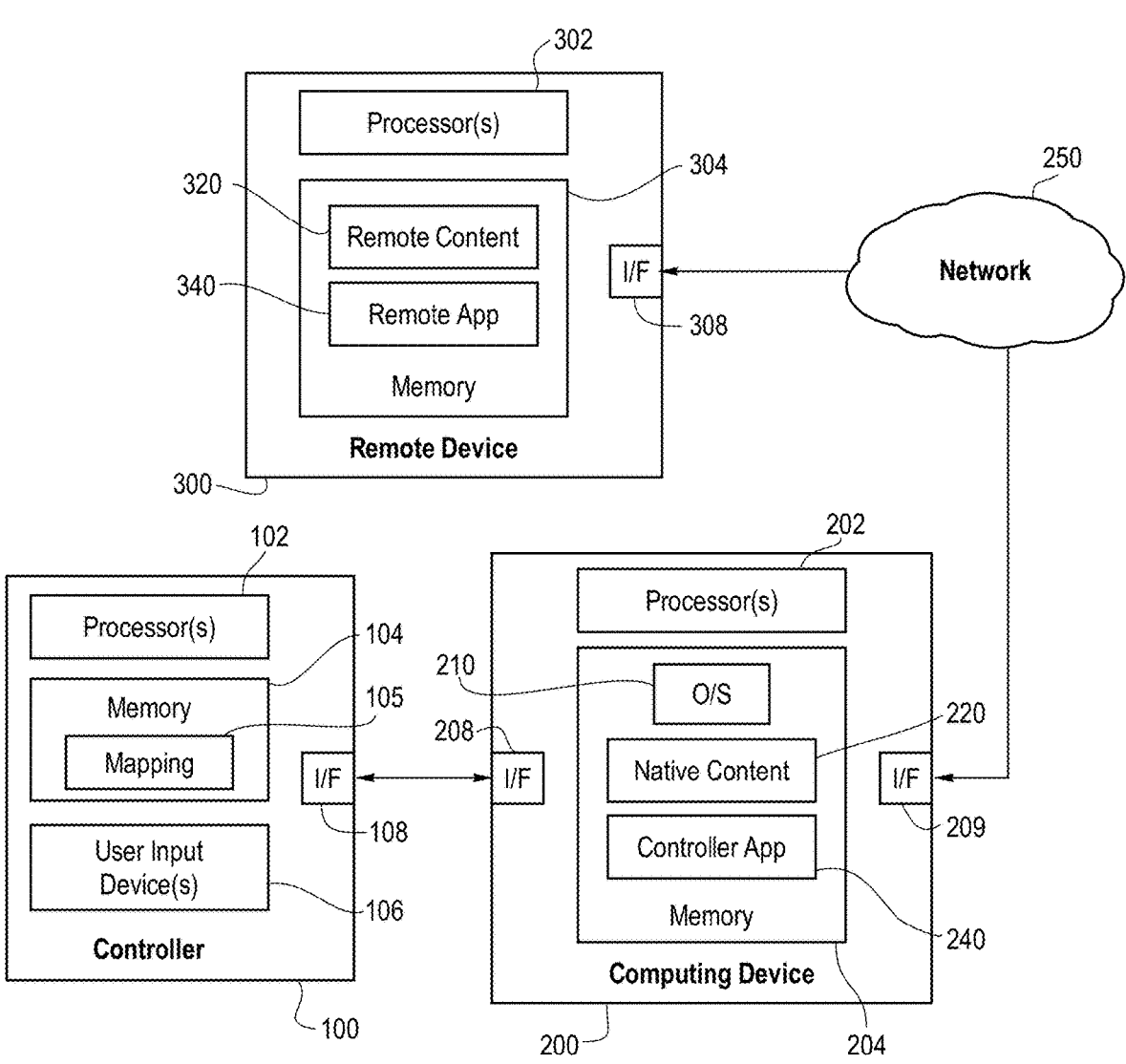
FIG. 1 is a block diagram of a computing environment of an embodiment.

In one embodiment, a non-transitory computer-readable storage medium storing a computer program having instructions that, when executed by one or more processors in a computing device, cause the one or more processors to: receive an input from a controller in communication with the computing device indicating actuation of one or more user input devices of the controller; and in response to receiving the input: un-focus content while keeping the content in a foreground; and display a subordinate view of the content.

In another embodiment, a method is provided that is performed in a computing device in communication with a controller. The method comprises: receiving an input from the controller indicating actuation of one or more user input devices of the controller; and in response to receiving the input, displaying a subordinate view of content, wherein the subordinate view provides an indication of a user's position in a queue to play the content.

In another embodiment, a computing device is provided comprising: an interface configured to communication with a controller; and one or more processors configured to communicate with the interface further configured to: receive an input from the controller indicating actuation of one or more user input devices of the controller; and in response to receiving the input, displaying a subordinate view of content.

In another embodiment, a non-transitory computer-readable storage medium storing a computer program having instructions that, when executed by one or more processors in a computing device, cause the one or more processors to: receive an input from a controller in communication with the computing device indicating interaction of one or more user input devices of the controller; in response to receiving the input from the controller, focus a user interface that presents content for engagement; and in response to receiving user input, un-focus content selected from the user interface and display the un-focus content subordinate to the user interface, and in response to receiving user input, dismiss a user interface that is currently presented that cannot un-focus, and in response to receiving user input, launch a user interface that is currently not presented.

In another embodiment, a system is provided comprising a controller and a computing device. The computing devices comprises: one or more processors; and a non-transitory computer-readable storage medium storing a computer program having instructions that, when executed by one or more processors, cause the one or more processors to: receive an input from the controller indicating actuation of one or more user input devices of the controller; and in response to receiving the input: un-focus content while keeping the content in a foreground; and display a subordinate view of the content.

Other embodiments are disclosed, and each of the embodiments can be used alone or together in combination.

DETAILED DESCRIPTION

Introduction

In one embodiment, a contextually-aware platform service switcher is provided. In another embodiment, a system and method for automatic content capability detection are provided. In yet another embodiment, a system and method for rich content browsing multitasking on device operating systems with multitasking limitations are provided. These embodiments can be used alone or in combination. Other embodiments are provided. It is important to note that any of these embodiments can be used alone or in combination, and details of these embodiments should not be read into the claims unless expressly recited therein.

Overview of an Exemplary Computing Environment

Turning now to the drawings, FIG. 1 is an illustration of a computing environment of an embodiment. As shown in FIG. 1, this environment comprises a user controller 100, a computing device 200, and a remote device 300. The user controller 100 and computing device 200 are in communication with each other via respective wired or wireless interfaces 108, 208. Likewise, the computing device 200 and the remote device 300 are in communication with each other via wired or wireless interfaces 209, 308. As used herein, "in communication with" can mean in direct communication with or in indirect communication with via one or more components, which may or may not be mentioned herein. For example, in the embodiment shown in FIG. 1, the computing device 200 and the remote device 300 are in communication with each other via a network 250 (e.g., the Internet, a local area network, a peer-to-peer wireless mesh, etc.). However, in other embodiments, the computing device 200 and the remote device 300 can communicate with each other in the absence of a network. Also, as used herein, the remote device 300 is "remote" in the sense that it is physically separate from the computing device 200 in some fashion. In many implementations, the physical distance is relatively great, such as when the remote device 300 is located in another town, state, or country. In other implementations, the physical distance may be relatively short, such as when the remote device 300 is in the same room or building as the computing device 200. Also, the term "remote device" can refer to a single remote device or multiple remote devices.

As shown in FIG. 1, in this embodiment, the controller 100 comprises one or more processors 102, a memory 104, and one or more user input devices 106. The user input devices 106 can take any suitable form, such as, but not limited to, a button, a joystick, a switch, a knob, a touch-sensitive screen/pad, a microphone for audio input (e.g., to capture a voice command or sound), a camera for video input (e.g., to capture a hand or facial gesture), etc. To be clear, as used herein a "user input device" refers to a control surface and not to the entire system or parent device on which user input devices are placed.

Generally speaking, the controller 100 can be used by a user in the selection and (passive or active) consumption of content (e.g., playing a game, watching a video, listing to audio, reading text, navigating a displayed user interface, etc.) presented using the computing device 200 in some fashion. The controller 100 may be referred to based on the content with which it is being used. For example, the controller 100 can be referred to as a game controller when it is being used to play a game. And if the controller 100 is being used to play a game on a mobile device, such as a phone or tablet (as opposed to a relatively-stationary game console), the controller 100 can be referred to as a mobile game controller. However, the same controller 100 may also be used to control the playback of non-game content, such as video or audio. Accordingly, a specific use should not be read into the term "controller" unless expressly stated.

The computing device 200 can also take any suitable form, such as, but not limited to, a mobile device (e.g., a phone, tablet, laptop, watch, eyewear, headset, etc.) or a relatively more-stationary device (e.g., a desktop computer, a set-top box, a gaming console, etc.). In the embodiment shown in FIG. 1, the computing device 200 comprises one or more processors 202 and a memory 204. In this particular embodiment, the memory 204 stores computer-readable program code for an operating system (O/S) 210 (e.g., iOS or Android), native content 220, and an application configured for use with the controller 100 ("controller app") 240. This application 240 will sometimes be referred to herein as the client platform operating service or system. Exemplary functions of this application 240 will be described herein. Also, as used herein, "native content" refers to content that is at least partially stored in the computing device 200. For example, native content can be wholly stored on the computing device; or native content can be stored partially on the computing device 20 and partially on one or more remote devices 300 or some other device or set of devices.

The remote device 300 also comprises one or more processors 302 and memory units 304 storing remote content 320 and an application ("app") 340 (which is sometimes referred to herein as the remote platform operating service or system) that can be used to communicate with the controller app 240 or another entity on the computing device 200.

It should be understood that more or fewer components than what are shown in FIG. 1 can be used. For example, the computing device 200 can have one or more user input device(s) (e.g., a touchscreen, buttons, switches, etc.), as well as a display (e.g., integrated with a touchscreen). Further, while the components in the controller 100, computing device 200, and remote device 300 are all shown in respective single boxes in FIG. 1, implying integration in respective single devices, it should be understood that the components can be located in multiple devices. For example, the processor 302 and memory 304 in the remote device 300 can be distributed over multiple devices, such as when the processor 302 is a server and the memory 304 is a remote storage unit. As used, the remote device 300 can also refer to multiple remote devices that are in communication with the computing device 200. Other variations for any of the devices 100, 200, 300 are possible.

Finally, the memory 104, 204, 304 in these various devices 100, 200, 300 can take any suitable form and will sometimes be referred to herein as a non-transitory computer-readable storage medium. The memory can store computer-readable program code having instructions that, when executed by one or more processors, cause the one or more processors to perform certain functions.

Exemplary Game Controller Implementation

Figure 2:
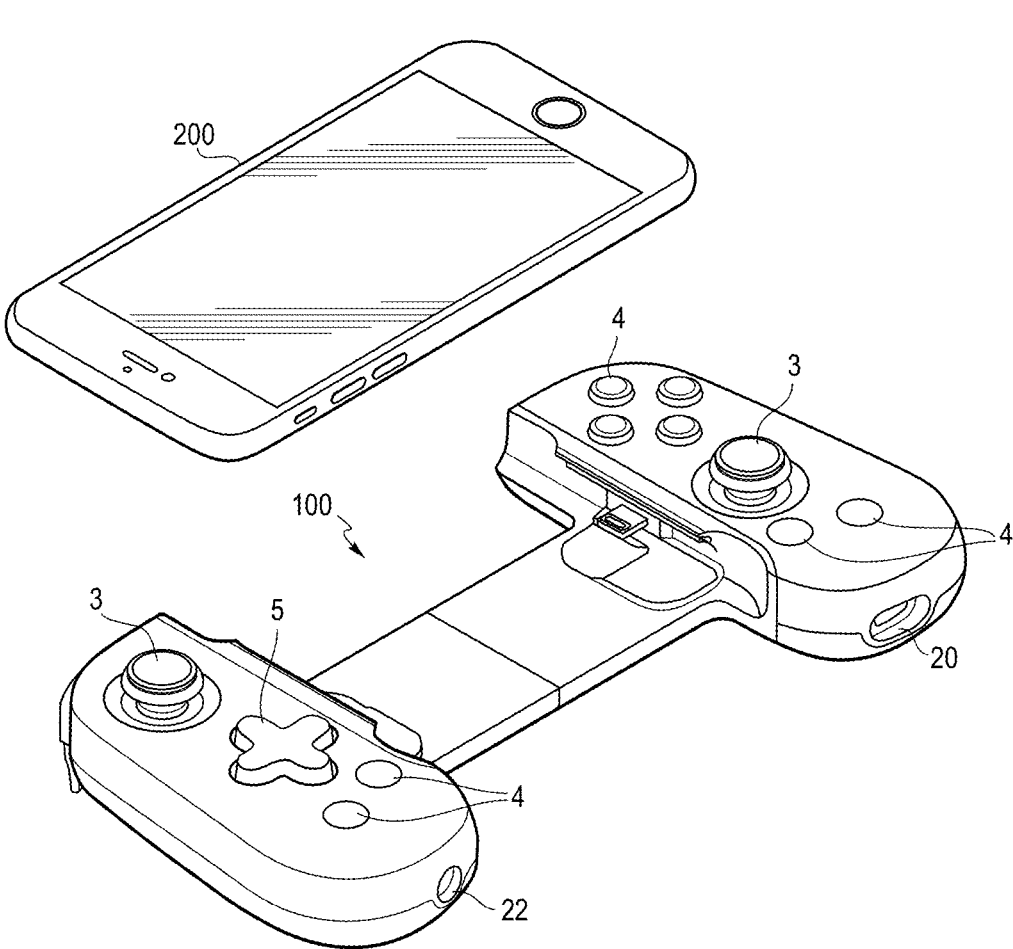
FIG. 2 is an illustration of a controller and computing device of an embodiment.
Figure 3:
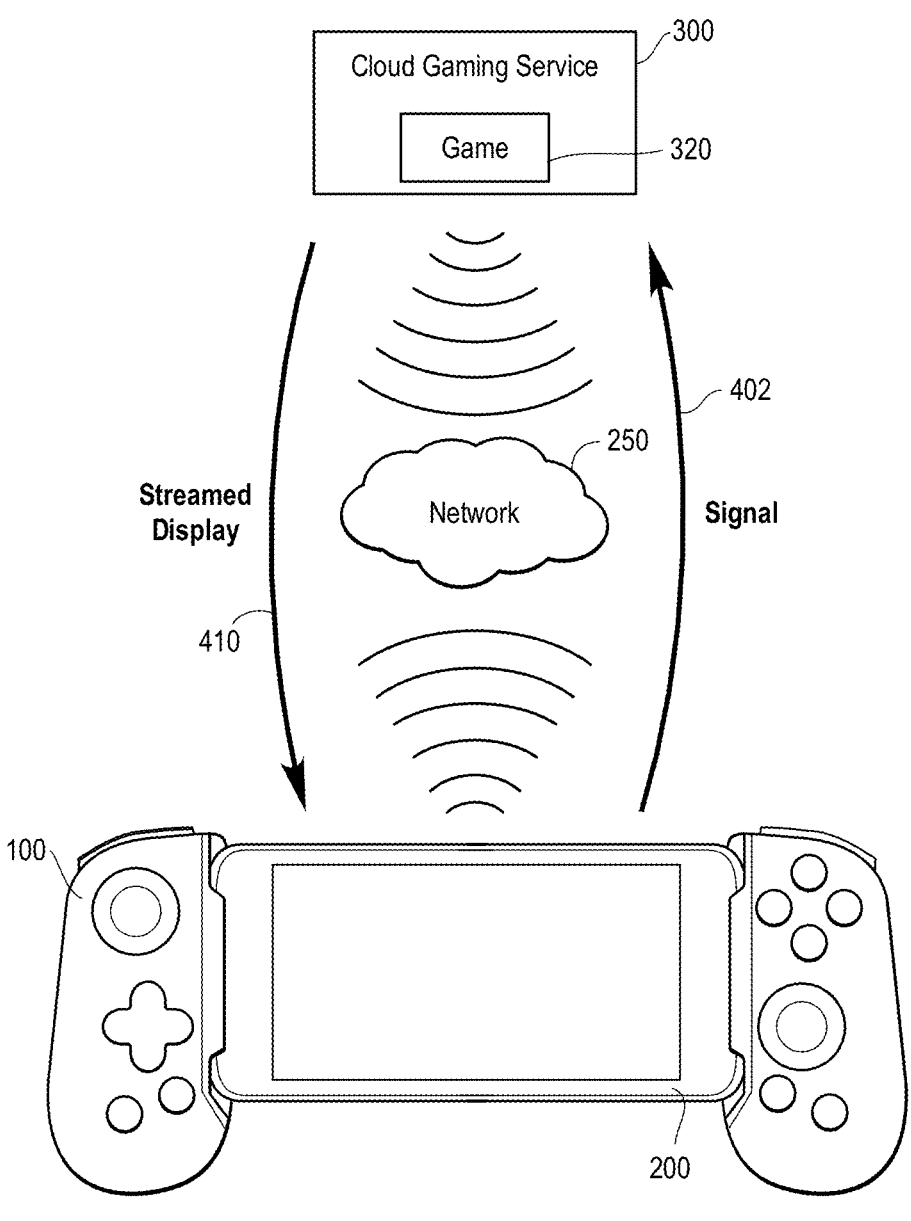
FIG. 3 is a block diagram of a computing environment of an embodiment.

As mentioned above, the controller 100, computing device 200, and remote device 300 can take any suitable form. For purposes of describing one particular implementation of an embodiment, the controller 100 in this example takes the form of a handheld game controller, the computing device 200 takes the form of a mobile phone or tablet, and the remote device 300 takes the form of a cloud gaming system. This example is shown in FIGS. 2 and 3. Again, this is just one example, and other implementations can be used. Further, as mentioned above, a game is just one example of content that can be consumed, and the controller 100 can be used with other types of content (e.g., video, audio, text). So, the details presented herein should not be read into the claims unless expressly recited therein.

Turning first to FIG. 2, FIG. 2 shows an example handheld game controller 100 and mobile phone 200 of an embodiment. This game controller 100 has a number of user input devices, such as joysticks 3, buttons 4, and toggle switches 5. In this example, the game controller 100 takes the form of a retractable device, which, when in an extended position, is able to accept the mobile phone 200. A male communication plug on the controller 100 mates with a female communication port on the computing device 200 to place the controller 100 and computing device 200 in communication with one another. The controller 100 in this embodiment also has a pass-through charging port 20 that allows the computing device 200 to have its battery charged and a headphone jack 22. In other embodiments, the controller 100 can connect to the computing device 200 through other means such as pairing wirelessly to the phone 200. Again, this is just an example, and other types of controllers can be used, such as those that do not fit around a mobile device.

As shown in FIG. 3, in this embodiment, the controller 100 can be used to play a game that is locally stored on the computing device 200 (a "native game" 220) or a game 320 that is playable via a network 250 on a cloud gaming service 300. In this example embodiment, remote gameplay, based on input from the game controller 100, the computing device 200 sends signals 402 to the cloud gaming service 300 and receives display data 410 back. In one embodiment, a browser on the computing device 200 is used to send and receive the signals 402, 410 to stream the game 320 to the user. There can be multiple variants of remote game play. One embodiment includes a host device, such a game console, PC, or other computing device not actively being controlled that can be streamed to the active computing device, such as a smartphone. from a host device (e.g., game console or PC) that a user can access remotely via their smartphone) and Another embodiment includes a cloud gaming service (which can be streamed from a data center), such as Xbox Game Pass, Amazon Luna, or other service, that can be streamed to the active computing device.

In one embodiment, the controller app 240 can facilitate the selection of a game (or other content). For example, the controller app 240 can display a user interface (e.g., on a display of the computing device 200 or on another display). The controller app 240 can also receive user input from the controller 100 to navigate and engage with content, for example, browse for, select, and launch a game from a displayed list of games. In this example, once the game is launched, input from the game controller 100 can be provided directly to the game or indirectly to the game through the controller app 240. As will be discussed in more detail below, the controller app 240 can enhance the standard experience offered on a computing device by extending functionality and providing enhanced interface capabilities in addition to the inherent interface of the computing device itself. For example, in some embodiments, the controller app 240 assigns a function to one or more of the user input devices on the controller 100 based on the particular content being consumed. As will be discussed in more detail below, such assignment can be done by sending mapping information 105 (see FIG. 1) to be stored in the memory 104 of the controller 100. In another embodiment, this assignment can also be achieved through a dynamic interface within the service 240 that intercepts and maps controller 100 input before propagating the input to the service 240.

In one embodiment, the controller 100 is used in a cloud gaming environment. The following paragraphs provide a discussion of such an environment. It is important to note that this is merely an example and that the details discussed herein should not be read into the claims unless expressly recited therein.

With the advent of cloud game streaming on the iOS platform in 2021, users could play games like Halo: Master Chief Collection on their mobile device through services like Xbox Game Pass and the now-defunct Google Stadia for the first time. But the user experience was plagued with issues: users would have to pin a browser page for each service they were interested in onto their iOS home screen and, much to their confusion, would have to further configure each pinned browser to work with their controller. The lack of discoverability of this feature in conjunction with the difficulty in getting it to work resulted in relatively-low adoption for cloud gaming on mobile in general. Prior gaming controllers did not initially offer any direct support for cloud gaming as a result. Users could launch and play native mobile games through the associated controller app, but instructions, user education, and features that enabled cloud gaming, arguably the most-disruptive technology in all of gaming within the last decade, did not exist. The main issue was that it was difficult to explain to users how to go about setting up cloud gaming due to the sheer amount of user complexity.

To address these issues and make cloud gaming far more accessible to a wider array of players, one embodiment embeds a content browser within the controller app 240 and pipes inputs from the controller 100 through the controller app 240 into the content browsers. With this embodiment, users can now have the benefits of both native gaming experiences and streamed gaming experiences all inside the controller app 240.

This approach presents several advantages. For example, because cloud games are often much more complex than their native mobile counterparts, users can be gradually onboarded onto cloud gaming after they have gotten used to playing simpler native games locally on the computing device 200. This allows cloud gaming to be a user's second experience. As another example, as will be discussed in more detail below, a user input device on the controller 100 can allow users to alternate between multiple cloud gaming services (e.g., Google Stadia and Amazon Luna) within the controller app 240, which enables much more rich experiences, as opposed to having them as independent web clips pinned to a user's home screen. Users can stay within one central application for all the streaming as well as native needs.

As another advantage, with these embodiments, users can take full advantage of hardware-software integration with the controller 100 to avoid unintended disconnects and reconnects in between bouts of gameplay. Typical apps running on the computing device 100 lack the ability to stay active in the background. In one embodiment, an app is allowed to be kept active in the background, which, when combined with the embedded cloud gaming experience, allows the user to persist their cloud gaming session even if they background the application when, for example, responding to a quick text message, so they never lose their place in the content. Users can still use their computing device 100 (e.g., as a phone), whether it is for music, charging, or other apps, and can shift back-and-forth between their gaming session and their previous context without the downsides.

Also, one of the biggest hurdles to making cloud gaming accessible is reducing queue time or wait time for a session. In some game streaming environments, the cloud service provider allocates remote instances that users can connect to, which can require users to wait before they enter into a gaming session. On mobile, where users expect to be able to do everything right away, being asked to wait, say, six minutes for a game session to start, can be especially vexing, especially when there are numerous free, instant, and downloadable alternatives that are basically one app store search away. In one embodiment, the controller app 240 allows users to start a cloud gaming session and through a subordinate (e.g., picture-in-picture) view, enable them to continue to utilize the controller app 240, which can contain game suggestions, user-generated content, and more while they wait for the session to load. This combination of the controller app 240, controller 100, and embedded cloud gaming experiences enables users to use their wait time productively, so they are not stuck waiting on a screen for minutes at a time as the service connects.

Further, as will be described in more detail below, the behavior of one or more user input device(s) on the controller 100 can be greatly enhanced when cloud gaming is embedded in the controller app 240 based on context. For example, when in the embedded cloud gaming view within the controller app 240, users can perform one press to move between the game session and the top-level integration dashboard, as well as back-and-forth between the two.

In one embodiment, to enable this fully-integrated cloud gaming experience for users, a web browser can be embedded inside the controller app 240 that is capable of receiving controller input at the same time as the larger application. In one example implementation, this is built on top of the operating system-provided WKWebView primitive on iOS and the WebView primitive on Android, respectively. When a user enters input through the controller 100, the event is first sent into the controller app 240, which then assesses the state of the controller app 240 to route the event accordingly. In the case of the browser, the controller app 240 can decide to route the input event to the browser when the browser is active and recently launched a game, and to route the event to other subsystems of the application otherwise. When the event gets routed to the browser, the browser then forwards the event into the underlying content, which can then respond to the event accordingly, usually by changing the state and modifying its display or making a sound.

Since most cloud streaming applications are currently hosted on the web, a content browser embodied as a web browser allows the controller app 240 to support a wide variety of cloud gaming platforms. Content can be launched from the controller app's integrated dashboard through user input, for example, either a gesture on the computing device 100 or an input into the controller 100, which the controller app 240 can determine to mean it should launch specific content. The specific instructions to launch the content can be stored in a content database stored remotely and sent to the controller app 240 via a remote procedure call. In the example of a cloud game, the database could specify the game be launched by visiting a specific URL in the browser, which would then load the necessary code and data to play the game within the browser, with minimal additional user intervention.

For example, if a user wishes to pause gameplay, they can do so through a number of ways, such as, but not limited to, pressing a button during gameplay. This could minimize the gameplay into a subordinate (e.g., picture in picture) view that allows the user to do other things within the controller app 240. The specific implementation details can differ by platform due to multitasking limitations on the platforms. For example, Android uses a picture-in-picture view that leverages existing overlay technologies available on the platform, while, on iOS, the corresponding primitive is not able to sustain games content reliably, so a picture-in-picture primitive can be developed that is capable of hosting an arbitrary web browser.

Unfortunately, again due to iOS system limitations, this browser may not be shown outside the surface of the controller app 240, so a number of alternative ways of showing the user state can be developed. For example, when the user places the controller app 240 in the background, the controller app 240 can send the user a push notification indicating to them that their game is still available in the background, and tapping the notification can resume gameplay. Another example is that the application state can be minimized into an iOS 16 Live Activity display, which persistently reminds the user that their gameplay session is still active. This can be accomplished by checking on a background event whether the user was actively playing a game, and if so, using iOS API calls to register the Live Activity display.

These content displays (e.g., picture-in-picture) can be used to perform other tasks while the user is queuing to start gameplay (e.g., for platforms such as Nvidia GeForce Now, which may have a limited number of available gameplay consoles). To make this experience more ergonomic and useful, a number of technologies can be developed to help surface key context, such as, but not limited to countdown timers, while queueing in line for gameplay. For one, key information can be extracted from the external content provider, such as, but not limited to, the user's position in the queue, from the browser. This can be achieved, for example, by injecting ECMAScript code into the content that can extract information and pipe that information to the application for alternate display. In a picture-in-picture view, this may be important because the position in the queue can be illegible when the content page is shrunken and needs to be expanded or otherwise reformatted to be legible in the view. This information can then surface in the aforementioned surfaces like a push notification, iOS Live Activity display, or on Android, a status indicator light or screen on the device.

Further, especially on iOS, it may be necessary to develop a way to ensure that a cloud gameplay session is kept active while in the background because applications can often be terminated if they are in the background for more than a few seconds to minutes, depending on the application. While users may infer that this is the case, since this is the standard behavior on certain operating systems like iOS, when using a picture-in-picture, users generally expect the content within the inner picture to persist while multitasking. Preferably, users would not lose their gameplay state, which can be extremely time-consuming and frustrating to restore. To do this, when the controller app 240 can receive an event indicating it is in the background, it can request the controller to keep the application alive for a set period of time. In one example implementation, it does not do so indefinitely to avoid impacting the computing device's battery life; if kept alive indefinitely, the user may find their device battery drained due to the background state because they forgot about their cloud gaming session. The controller 100 can store this request in its memory and then send API calls at a regular interval to the device operating system 210 to ensure the application stays active.

As noted previously, the exemplary computing and game environments discussed above are merely examples. The various embodiments discussed herein can, but do not have to be, used with these exemplary computing and game environments. As such, the details presented herein should not be read into the claims unless expressly recited therein.

Programmable User Input Device(s)

As mentioned above, in one embodiment, some or all of the user input devices of the controller 100 are programmable by the controller app 240. That is, the controller app 240 can assign a specific function to a specific user input device (e.g., so a certain function happens when a specific button is pressed) or to more than one user input device (e.g., the certain function happens when two or more specific buttons are pressed simultaneously or in sequence). For ease of illustrating the following embodiments, a single button is going to be used as the "one or more input devices" that are programmed with a function. However, it should be understood that more than one input device may need to be actuated to trigger the function and that other types of user input devices (e.g., a switch, knob, joystick, a microphone, a camera, etc.) can be used instead of a button.

The controller app 240 can assign a function to the button in any suitable way. For example, in one embodiment, the controller app 240 provides the controller 100 with an identification of the button and a command that the controller 100 is to send to the computing device 200 when the button is pressed. That mapping information 105 can be stored in the memory 104 of the controller 100. When the button is pressed, the one or more processors 102 in the controller 100 use the stored mapping information 105 to identify the command associated with the pressed button and then send that command to the computing device 200. In another embodiment, the mapping information is stored in the memory of the computing device 200. In that embodiment, when the button on the controller 100 is pushed, the processor(s) 102 in the controller 100 can provide the computing device 200 with the identification of the button, and the controller 100 uses its internally-stored map determined by the content state to execute the appropriate command. In yet another embodiment, the mapping can be stored on a remote device 300, which the computing device 200 can query. In this embodiment, when the controller 100 button is pressed, the processor(s) 102 therein can provide the computing device 200 with the identification of the button; the controller app 240 can then send information to the remote device 300 related to the button press, including, but not limited to, the identity of the button and the content state of the controller app 240. The remote device 300 can respond with instructions for the controller app 240 on how to respond to the press, or modify display information it had already been sending to the controller app 240. Other ways of assigning a function to a button can be used.

Any suitable function can be assigned to the button on the controller 100. In one embodiment, the function that is assigned to a button is based on whether selected content is consumable remotely from a remote device 300 (i.e., remote content 320) or locally from the computing device 200 (i.e., native content 220). If the content is playable remotely from the remote device 300 (e.g., using a browser in the computing device 200), the controller app 240 (or some other entity) can assign a certain function to the button. However, if the content is playable locally from the computing device 200, the controller app 204 (or some other entity) can assign a different function to the button. So, the function of the button depends on the context of the content (e.g., the logic of the button assignment can be done in response to the content state, so that the logic maps states to functions). Many alternatives can be used. For example, instead of basing the assignment of the button on the location of the content (local vs. remote), the assignment can be based on whether the content is focusable or un-focusable, as discussed below, whether the content has a prominent interface that needs to be wholly displayed, whether the interface has an alternate UI state that may be better suited to the interface device, based on a user-stated preference, or other factors.

Exemplary Programmable Functions

The following paragraphs provide examples of various functions that can be assigned to the button. It should be understood that these are merely examples and that other types of functions can be assigned. Further, while some of the content in these examples are games, it should again be understood that other types of content, including video, audio, and text, can be used.

In one example, the content playable from the remote device 300 is focusable, content playable locally from the computing device 200 is un-focusable, and the functions assigned to the button on the controller 100 take this difference into account. As used herein, "focusable content" refers to content that can be selectively focused and un-focused via a user input from the controller, a user gesture on the gameplay device, programmatic means, or another event propagated to the content. When content is in focus, the content is expected to respond to user input from the controller 100 in its normal use. In one embodiment, when a game is in focus, information about actuation of a joystick, switches, etc. on the controller 100 can be provided to the game (e.g., to move a character in the game). When content is not in focus, the content does not normally respond to user input from the controller 100. Instead, that user input can be provided to whatever content is currently in focus, and in some embodiments, is not provided to the content at all. So, if a user interface of the controller app 240 is in focus and the game is not in focus, movement of the joystick can cause movement of a cursor in the displayed user interface instead of movement of the character in the game. In some embodiments, the content is prevented from receiving user input as one exemplary means of preventing response to user input, but in other embodiments, the content can be provided user input and told by the platform operating system not to respond to the input, or a subset of the user input the controller 100 receives is passed on to the content.

Figure 4:
FIGS. 4 and 5 are screenshots of an embodiment.
Figure 5:
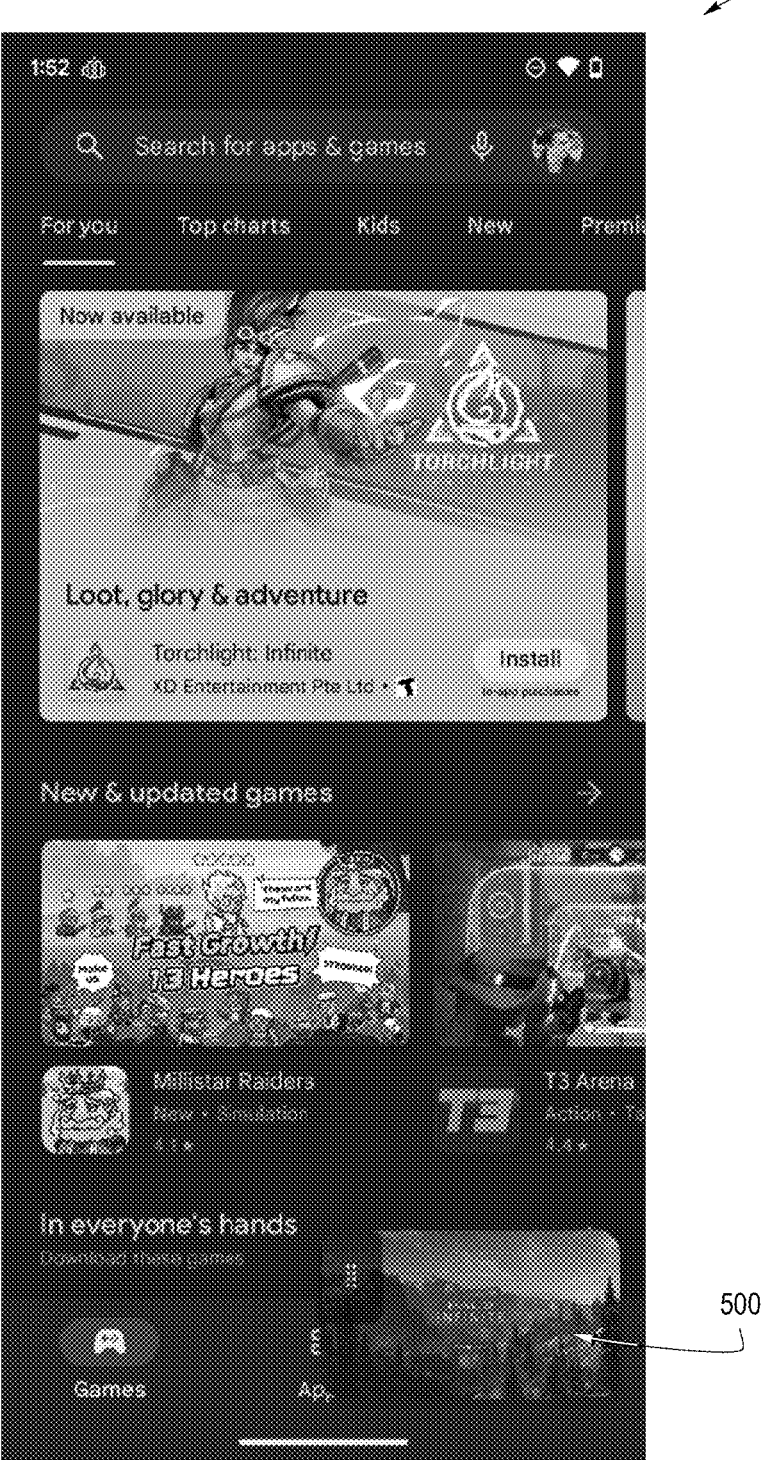

In some embodiments, un-focused content is still displayed to the user in some fashion. (In contrast, un-focusable content is either open (in which case the content is displayed) or closed (in which case the content is not displayed).) In one embodiment, the un-focused content is displayed in a minimized display area in a picture-in-picture display. The non-minimized display area in the picture-in-picture display can display other content, such as, but not limited to, a user interface of the controller app 240, native content 220 (e.g., another game, a web browser, etc.), or other remote content 320. For example, FIG. 4 shows un-focused content (here, a game) in a minimized display area 400 in a picture-in-picture display and a user interface of the controller app 240 in the non-minimized display area 410, allowing the user to select other native or remote content. As another example, FIG. 5 shows an un-focused game in a minimized display area 500 in a picture-in-picture display and a web browser in the non-minimized display area 510. These are merely examples, and other apps, etc. can be shown in the minimized and non-minimized display areas.

Instead of the un-focused content being a miniaturized version of what would otherwise be displayed, other types of representation of the un-focused content can be displayed. The representation can take any suitable form, such as, but not limited to, a banner (e.g., with the name of the content) overlaid on top of other displayed content (an overlaid subordinate user interface)), a side-by-side display, an icon, a change in how other content is displayed, etc. As will be discussed in more detail below, the representation can provide dynamic information to the user about the content, such as a user's place in a queue, a countdown or timer for when their game session will start, a chat or message count, an interaction indicator, general state, or other appropriate information communicating the un-focused content state, so the user can productively and simultaneously utilize the focused content inside of the overall platform operating service. In certain mobile game controller embodiments, this can be highly advantageous because the controller app can be in landscape mode and be navigable with the mobile game controller input device, so the user can remain in their context without having to detach the mobile game controller or revert to the overall device operating system's primary interface, which would potentially cause them to change orientations or relinquish control of their input experience. In such an embodiment, the user is thereby able to remain within the abstraction of a gaming system experience created on the mobile device.

Figure 6:
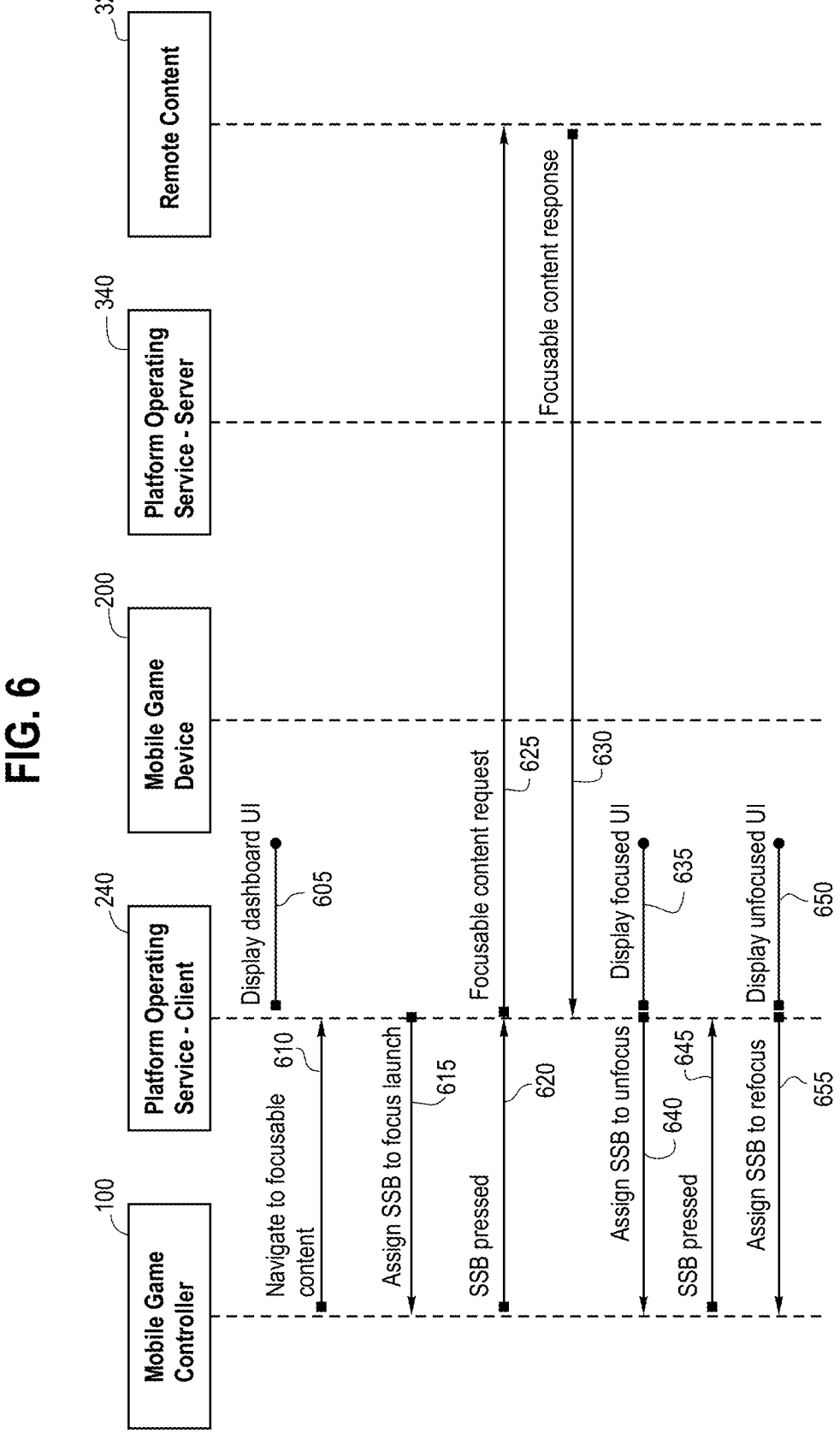
FIG. 6 is a flow diagram of an embodiment related to focusable content.
Figure 7:
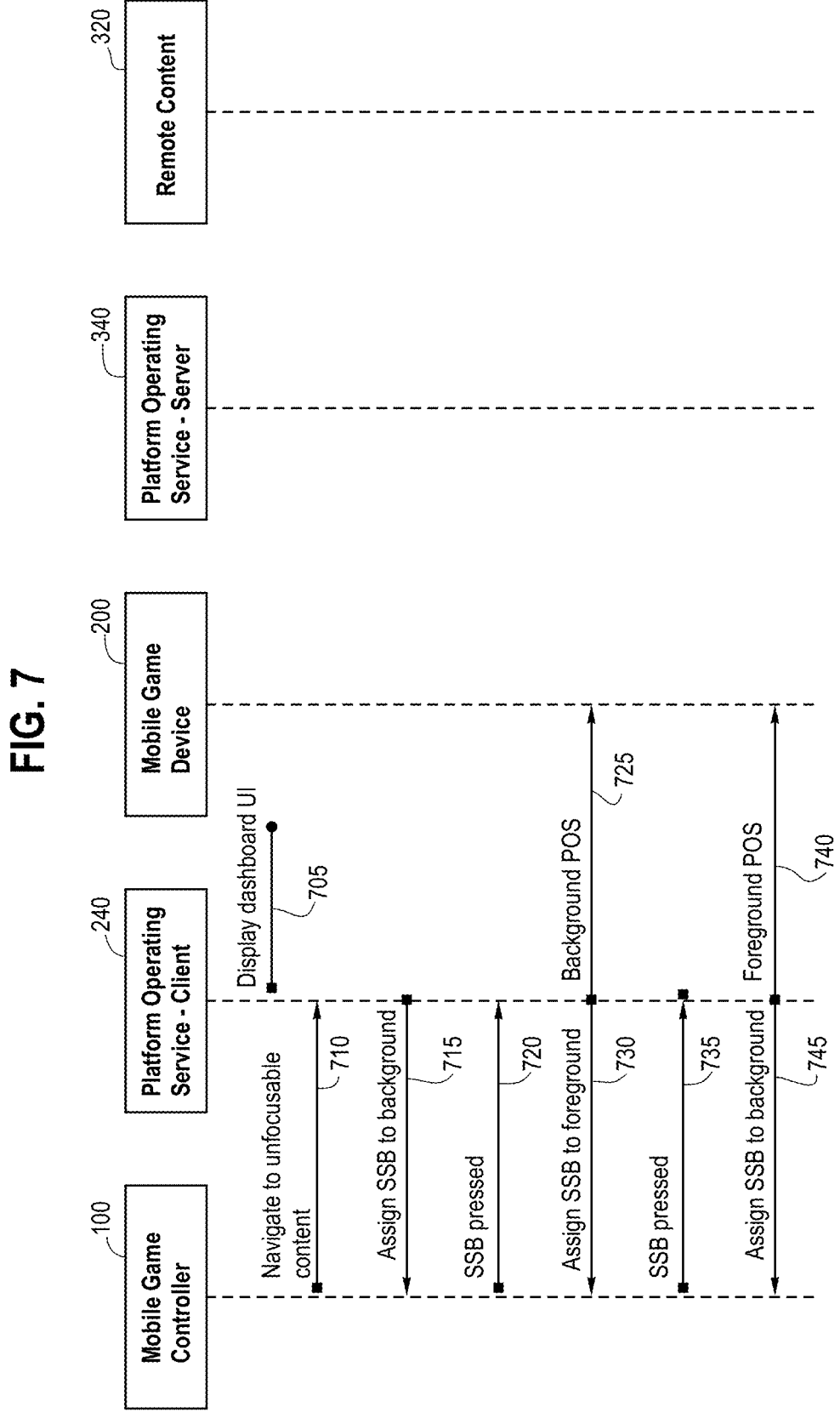
FIG. 7 is a flow diagram of an embodiment related to un-focusable content.

Turning again to the drawings, FIG. 6 is a flow diagram illustrating the process of assigning a function to a button on the controller 100 to focus/un-focus focusable content. In this example, the controller 100 takes the form of a mobile game controller, the controller app 240 takes the form of a client platform operating service, the remote app 340 takes the form of a server platform operating service, and the remote content 320 takes the form of a game. Also in this example, the button on the controller 100 is referred to as a "software service button (SSB)," as, in this example, un-focusing the content causes a user interface of the client platform operation system (e.g., the controller app 240) to be displayed. As shown in FIG. 6, the controller app 240 causes a user interface to be displayed on the computing device 200 (act 605), the user then uses the appropriate user input device(s) on the controller 100 to navigate to desired content (act 610). For example, movement of a user input device, e.g. the right joystick or directional pad, can cause a cursor to move on the displayed user interface to select content, cause selected content to be displayed larger or differently (e.g., with a darkening layer or outline, scaling, animation, etc.). Also, as will be discussed in detail below, the user interface can present both focusable content (e.g., remote content 320) and un-focusable content (e.g., native content 220) for selection by the user. The flow diagram in FIG. 6 is directed to focusable content (more specifically, to toggling/swapping between focusing and un-focusing the focusable content), whereas the flow diagram in FIG. 7 is directed to un-focusable content (more specifically, to toggling/swapping between opening and closing un-focusable content).

In this example, when focusable content is available and unfocused, the SSB is initially assigned to the function of launching the selected content (act 615). So, when the SSB is pressed (act 620), the controller 100 sends the assigned command to the controller app 240 on the computing device 200 (act 620), in response to which the controller app 240 sends a request to the remote app (content platform service) 340 for the focusable content (act 630). The focused content is then displayed in the appropriate user interface (e.g., web browser) (act 635), and the controller app 240 re-assigns the function of the SSB to un-focus the content (act 640). So, when the SSB is later pressed, the controller 100 sends the newly-assigned command to the controller app 240 (act 645), which causes the content to be displayed in an un-focused manner (e.g., in a minimized picture-in-picture display, as an overlaid banner, etc.) (act 650). The controller app 240 then re-assigns the function of the SSB yet again, this time to re-focus the content (act 655). So, the SSB is used in the example to toggle between focusing and un-focusing the focusable content. In addition to the SSB, the platform operating service 240 can also maintain contextual behavior in response to other interfaces on the computing device 200, for example, available touch interface, button press, or movement-based gesture, allowing for a single controller interface to behave in the same fashion as the SSB.

As mentioned above, the user interface of the controller app 240 can present both focusable content (e.g., remote content 320) and un-focusable content (e.g., native content 220) for selection by the user. FIG. 7 is a flow diagram related to un-focusable content. As shown in FIG. 7, the controller app 240 causes a user interface to be displayed on the computing device 200 (act 705), The user then uses the appropriate user input device(s) on the controller 100 to navigate to desired content (act 710). In this example, when un-focusable content is selected, the SSB is initially assigned to place the controller app 240 in the background (act 715). So, when the SSB is pressed (act 720), the controller app 240 is placed in the background by the processor(s) 202 of the computing device 200 (act 725). This would cause the user interface to no longer be displayed; instead, the selected native content 240 would be displayed. The function of the SSB is reassigned to move the controller app 240 in the foreground (act 730). That way, when the SSB is later pressed (act 735), the controller app 240 would be moved to the foreground (act 740), and the function of the SSB would revert to placing the controller app 240 in the background (act 745). So, the SSB is used in the example to toggle between placing the control app 240 and the native content 240 in the foreground/background.

As mentioned above, in certain embodiments, the controller navigation can include the ability to foreground and background platform operating services. In certain embodiments, the term foreground can refer to prioritizing a platform operating service's user interface (e.g., maximizing, highlighting, switching to, etc.) for interaction on a computing device. In certain embodiments, the term foreground could also refer to prioritizing the processes and resources in a computing device for the associated platform operating service. In certain embodiments, the term background could refer to de-prioritizing a platform operating service's user interface (e.g. minimizing, dimming, switching from, etc.) as to allow for another primary interaction intent to foreground. In certain embodiments, the term background could refer to de-prioritizing the processes and resources in a computing device for the associated platform operating service.

When content is in the background, the computing device 200 may reclaim resources in the computing device 200 (e.g., memory, network connections, processing resources, etc.). When the user later wants to use the content (put the content in the foreground), the content may need to be reloaded. For example, for local content reload, the content can be reloaded from the memory 204, resuming the state from disk, which may not be possible if the content does not provide an adequate persistent state restoration mechanism. For remote content reload, closing the connection to the remote content server 300 could erase the content state or the connection may be reallocated so the user will need to wait to be allocated a new collection/remote content server.

In contrast, when the content is in the foreground, the computer device 200 can avoid reclaiming resources in the computing device 200. In some situations, content in the foreground is displayed or otherwise presented to the user, whereas content in the background is not.

Figure 8:
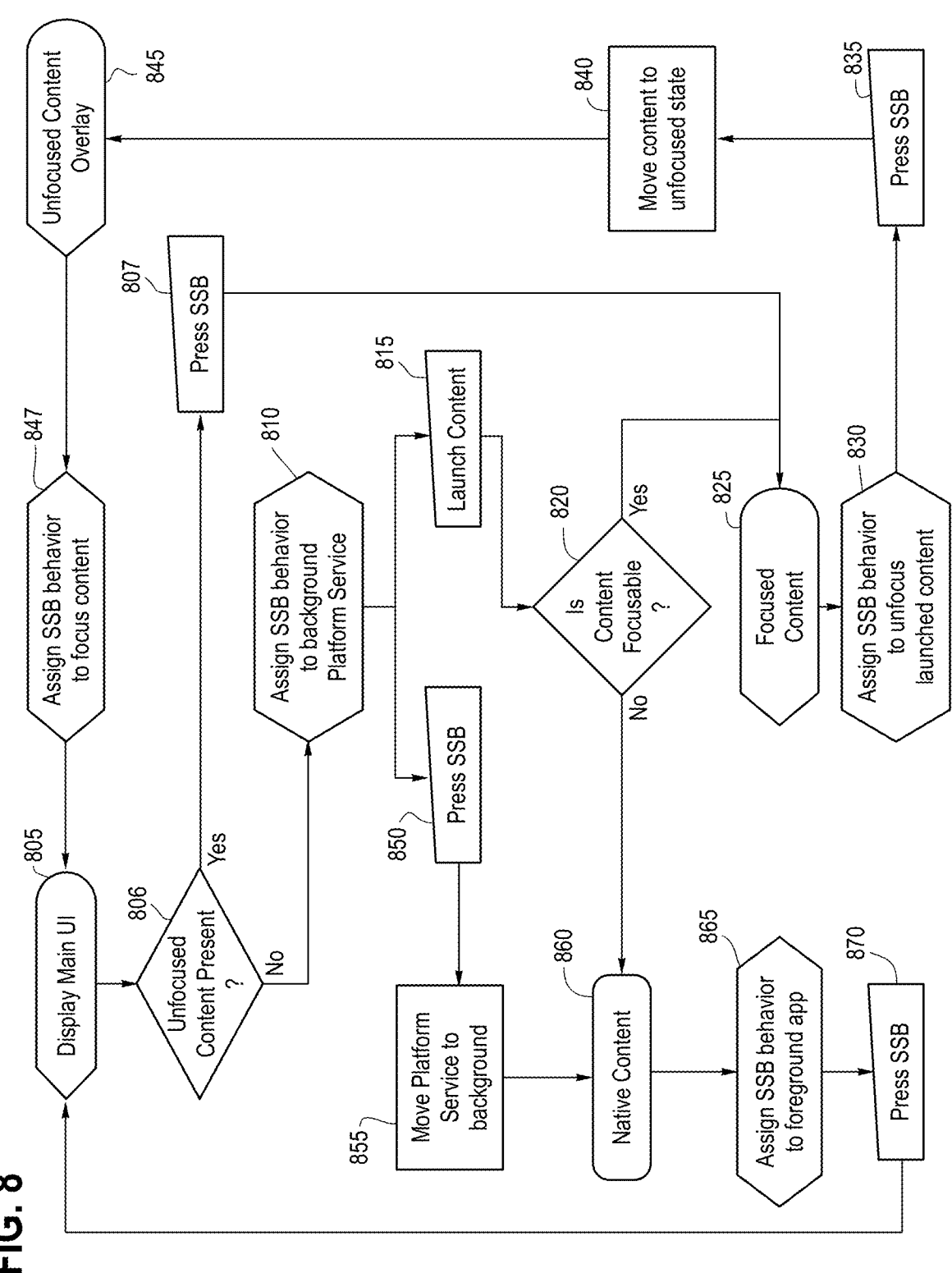
FIG. 8 is a flow chart of a method of an embodiment for assigning a function to one or more user input devices of a controller.

As mentioned above, FIG. 6 is directed to an example flow for focusable content, and FIG. 7 is directed to an example flow for un-focusable content. FIG. 8 is a flow chart showing an example of how both flows can interact. As shown in FIG. 8, the controller app 240 displays a user interface, which can present both focusable content (e.g., remote content 320) and un-focusable content (e.g., native content 220) (act 805). Next, a determination is made regarding whether unfocused content is present (act 806). If unfocused content is not present, the controller app 240 assigns the SSB the function of placing the controller app 240 in the background (act 810). If the SSB is pressed when unfocused content is present, the controller app 240 can determine whether focusable content is available (act 820). When available, the focused content is presented (act 825), and the SSB is assigned to un-focus the content (act 830). So, when the SSB is pressed (act 835), the processor(s) 202 in the computing device 200 move the content to the un-focused state (act 840) and display the un-focused content as an overlay, minimized picture-in-picture display, etc. (act 845). The SSB behavior is then assigned to focus content (act 847). That way, if unfocused content is present at act 806, pressing the SSB (act 807) causes the content to re-focus (act 825). Thus, the SSB in this part of the flow chart serves to toggle between focusing and un-focusing the content. It should be noted that in other embodiments, this contextually-aware focus toggle behavior could be initiated through other interface mechanisms on a controller 100 or through user devices on the computing device.

Referring to earlier in the flow chart, if the SSB is pressed when no focusable content is launched (act 850), the controller app 240 is moved to the background (act 855), and previously-selected native content 220 is moved to the foreground (act 860) (this also occurs if it is decided in act 820 that the content is not focusable). The function of the SSB is then assigned to move the controller app 240 to the foreground (act 865). That way, when the SSB is pressed (act 870), the main user interface is displayed (act 805).

As mentioned above, when un-focusable content is swapped out for the display of the main user interface, the un-focusable content is placed in the background. By being in the background, resources in the computing device 200 can be reclaimed. In that situation, when the content is swapped back to the foreground, the user may need to wait for the processor(s) 202 of the computing device 200 to re-populate states of the content or to relaunch the content altogether.

In one embodiment, when focusable content is un-focused, the content is still kept in the foreground and not moved to the background, even though the user may not be currently actively interacting with the content. This can prevent the previously discussed detriments, such as state loss, from occurring. This feature can have particular advantages in the context of gameplay. For example, some remote games have a waiting list to play (e.g., when the game supports play by a limited number of users). When the game is launched and is full, the user is placed in a queue. However, if the user places the game in the background, they may lose their place in line. In other instances, there is simply a load time for the session to start because a remote server has to, for example, be configured to have the game and user account set up to allow for a cloud gaming session. By keeping the game in the foreground, when un-focused, the user keeps their place in line while, by being un-focused, the user can use other services or apps on the computing device 200 to multitask, as will be discussed further below. Also, keeping the content in foreground provides the ability to perform rich display or enter/exit the un-focused state when entering/exiting the line, as will also be discussed further below.

Figure 9:
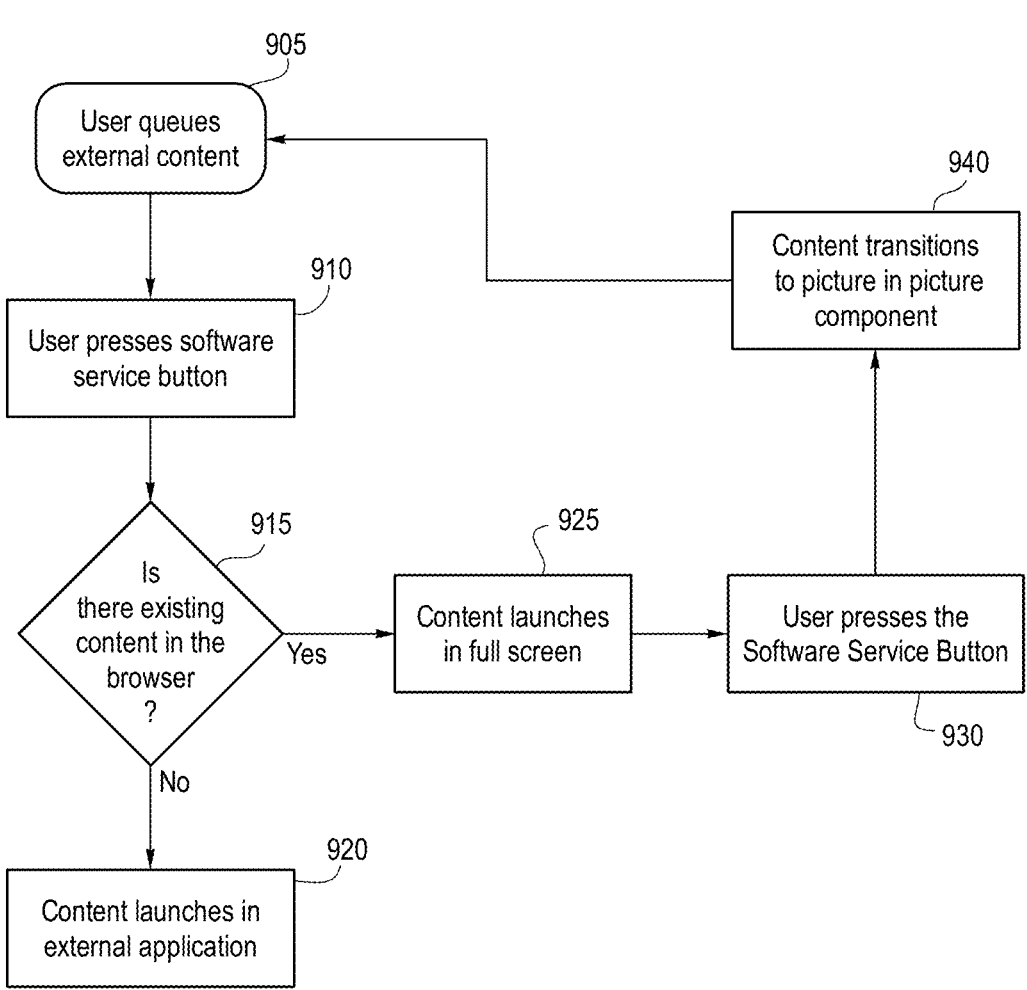
FIG. 9 is a flow chart of a method of an embodiment for using a picture-in-picture view of an un-focused application to keep a user's place in a queue.

FIG. 9 is a flow chart that illustrates this example process. As shown in FIG. 9, when the user is in a queue for remote content (act 905) and then presses the SSB (act 910), the computing device 200 determines if there is existing content in a browser (act 915). If there isn't, content is launched in an external application, as discussed above (act 920). However, if there is, the content is launched in full screen mode (act 925). When the user later presses the SSB (act 930), the content transitions to a picture-in-picture or another representational view (e.g. a banner overlay) (act 940). That way, the user keeps their place in the queue while being able to multitask. In some embodiments, the representation of the content can show the user's position in the queue and/or alert the user when they are out of (or close to being out of) the queue. This could be represented by a player count, countdown indicator, or other affordance within, or overlaid on top of, the platform operating service or even overlaid on the computing device's operating interface. In one embodiment, picture-in-picture mode can be automatically unfocused if it is detected that a user enters a queue or is in a lobby, or other passive waiting situation, allowing the user to seamlessly return to the platform operating service and appropriately routing controller 100 input allowing for multitasking. As will also be discussed further below, keeping a user's place in a queue can be important given the time to ramp up to the game or get ready to start. In some environments, only the user's position in the queue could be available. Also, the queue and real-time changes thereof can be a proxy for time remaining before gameplay can begin.

Figure 10:
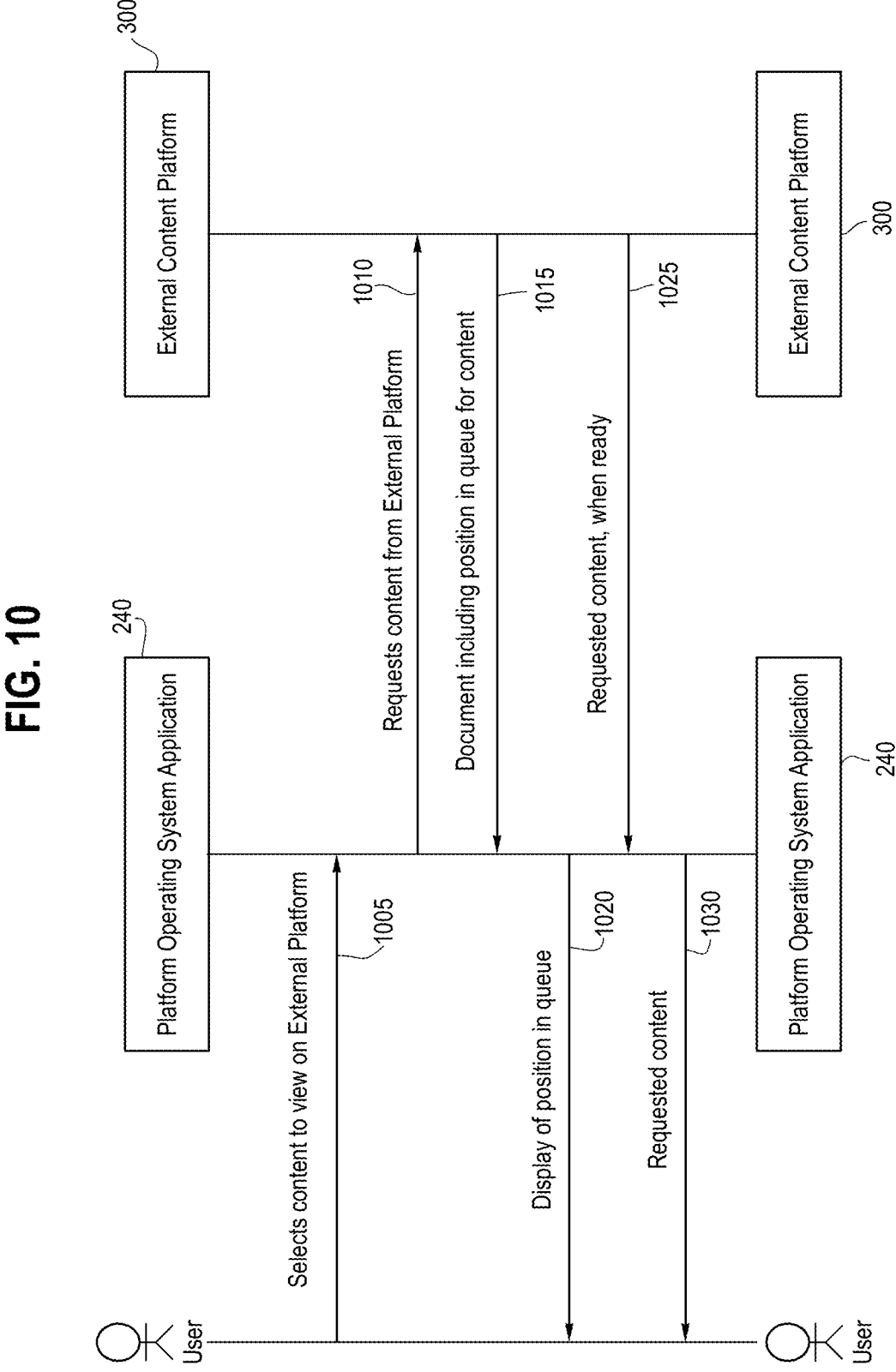
FIG. 10 is a flow diagram of an embodiment for keeping a user's place in a queue.

FIG. 10 is a flow diagram that illustrates this process. As shown in FIG. 10, when the user selects content to view on an external platform 300 (act 1005), the controller app 240 requests the content from the external platform 300 (act 1010). A document including the position in the queue is returned (act 1015) and displayed to the user (act 1020). When ready, the content is provided and presented to the user (acts 1025, 1030).

Automatic Content Capability Detection

As mentioned above, the user interface of the controller app 240 can present both focusable content (e.g., remote content 320) and un-focusable content (e.g., native content 220) for selection by the user. In some situations, not all content may support the controller 100 as an input device. For example, content may have restrictions around which controllers can be used. These restrictions can relate to, for example, operating system issues, network connectivity, input compatibility limitations, application-level restrictions on input devices, licensing issues, software restrictions placed by the manufacturer, local legal issues, geographic limitations, and others.

Figure 11:
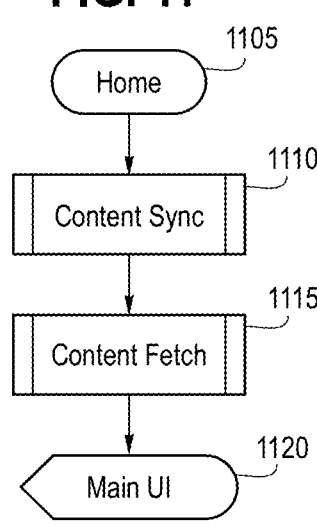
FIG. 11 is a flow chart of a method of an embodiment for determining content to include for selection on a user interface display.
Figure 12:
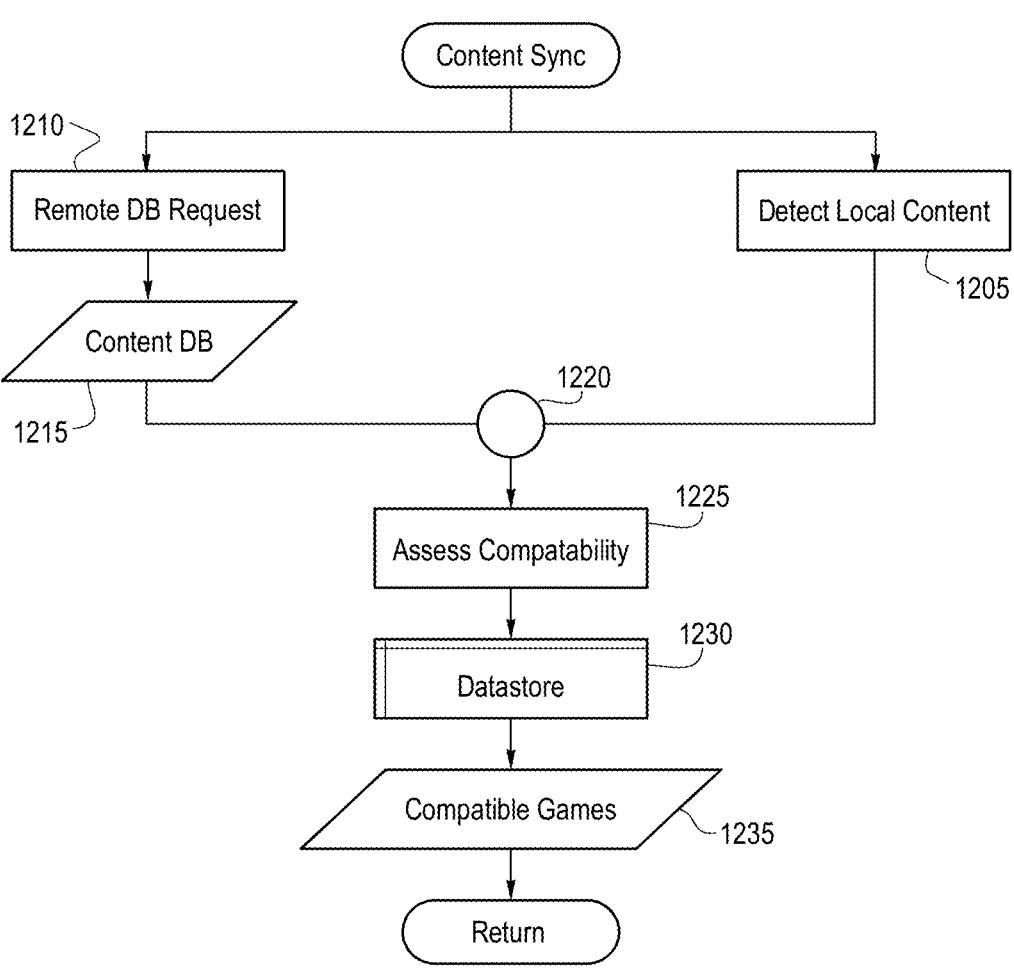
FIG. 12 is a flow chart of a content sync method of an embodiment.
Figure 13:
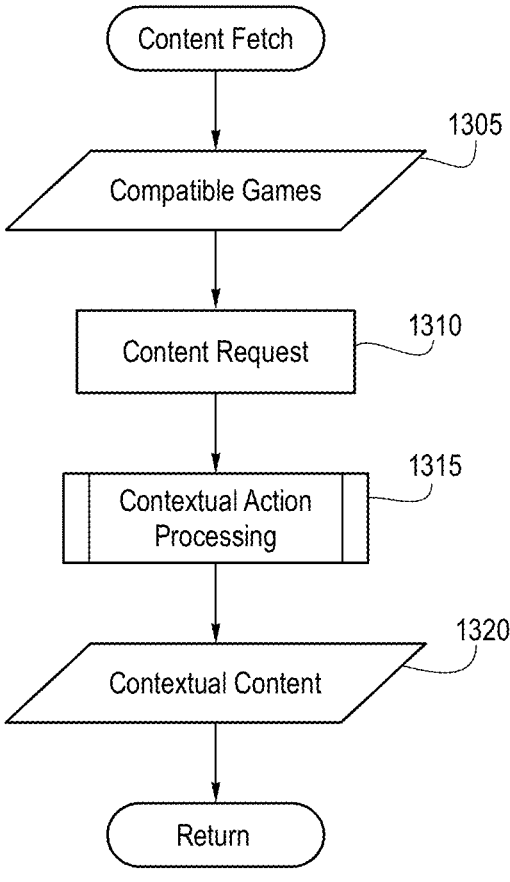
FIG. 13 is a flow chart of a content fetch method of an embodiment.

In one example, which will be illustrated in conjunction with FIGS. 11-13, the remote device 300 is configured to provide only remote content 320 to the computing device 200 that is compatible with the controller 100, whereas some native content 220 on the computing device 200 may not be compatible with the controller 100. The controller app 240 can determine which native content 220 is compatible with the controller 100 based on the compatible remote content 330 it receives from the remote device 300. That is, as shown in FIG. 11, in this example, from the home position (act 1105, the controller app 240 performs content sync (act 1110) and content fetch (act 1115) processes, so that only playable content is provided on the main user interface for user selection (act 1120). FIG. 12 is a flow chart of a content sync process of an embodiment, and FIG. 13 is a content fetch process of an embodiment. These figures will be described below.

Turning first to FIG. 12, in the content sync process of this embodiment, the controller app 240 discovers the native (local) content 220 on the computing device 200 (act 1205) and sends a remote database request to the remote device 300 (act 1210) to get a content database (act 1215), which identifies the remote content 320 on the remote device 300. As mentioned above, in this example, the content database can contain content that is compatible with the controller 100. The controller app 240 compares the content in the content database with the detected local content (act 1220) to assess compatibility (act 1225). The controller app 240 compares the local and remote content results to assess compatibility (act 1225) and stores a database of compatible content (act 1230), which, here, would be the remote content database and whichever local content is deemed compatible with the controller 100 based on the result from the remote content database. Only verified compatible and relevant content is stored and provided back to the main process, keeping unrelated content private on the computing device 200. That is, in this embodiment, local content is kept on the client side until it can be assessed for compatibility and relevance before returning a relevant content data set to be used in the content fetch.

As shown in FIG. 13, during the content fetch process, the server 300 receives the compatible games information (act 1305), as well as a request for content (act 1310). So, in this embodiment, an identification of the local content 220 that is compatible with the controller 100 is provided as part of a fetch request. The server 300 then performs contextual action processing (act 1315) and contextualizes the content (act 1320). This can involve assigning behavior to a display region for the content in the user interface. For example, if content can be served from the remote device 300, a "stream" or "cloud" icon or alternate signifier can be displayed, or a download button can be provided for downloading native content. As another example, if certain content does not currently support the controller 100, a mechanism can be provided for the user to send a request to have that content support the controller 100 in the future.

The server 300 then provides the controller app 240 with a list of compatible content based on user-specific metrics and segmentation algorithms. This content is associated with relevant actions that are included in the return data model. These actions and capabilities are provided to the computing device 200 to be used in hardware button mapping and user interface affordances.

Figure 14:
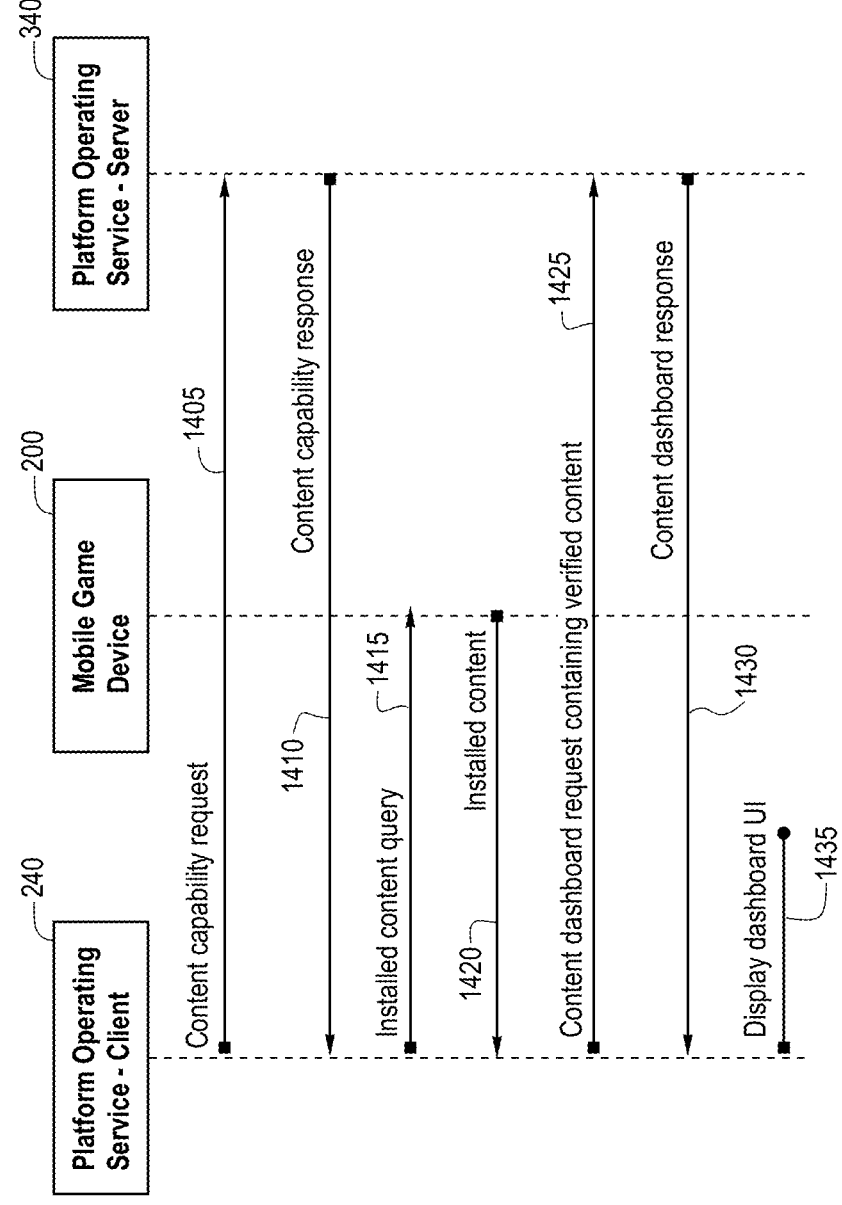
FIG. 14 is a flow diagram for content sync and fetch processes of an embodiment.

FIG. 14 is a flow diagram that illustrates the above steps. As shown in FIG. 14, the controller app 240 sends a content capability request to the server 300 (act 1405), which responds with a response (act 1410). The controller app 240 then sends an installed content query to the computing device 200 (act 1415), which returns information about the installed content (act 1420). The controller app 240 then sends a request to the server 300 for a content dashboard containing verified content (act 1425). The server 300 provides that information (act 1430), and the controller app 240 displays that information in the dashboard user interface (act 1435).

Example: Game Controller Overview

The following sections provide example implementations of some of the embodiments discussed above. It should be noted that these are just examples and the details discussed herein should not be read into the claims unless expressly recited therein. In some of these examples, the mobile game controller has one or more software service buttons which, when selected, can perform in-app functions or functions through an operating system API as opposed to providing the inputs solely via the standard input device framework provided from the device operating system meant for standard game controller inputs. A software service button may send inputs via the mobile operating system's input device framework based on user context (e.g., whether content is focusable/un-focusable, whether content is native content or remote content, etc.). For example, in some embodiments, the behavior of the software service button can change depending on whether the current application is in the foreground or background. For example, when the user is playing the game inside a web browser within the platform operating service, the software service button behavior changes based on context. For example, while streaming a game inside the Amazon Luna service, pressing the software service button can now send a Human Interface Device (HID) command that opens up the Amazon Luna menu by triggering the "Start" button or invoke the cloud gaming service's own capture functionality.

In certain embodiments, the platform operating service application can be launched with the software service button, and the user can navigate the interface with the inputs on the device. In certain embodiments, when a user launches the platform operating service application, they can use the controller to search for compatible games within the platform operating service and can perform appropriate actions, such as launch into or download them via provided contextually-aware actions mapped to a controller. The integrated application can also allow users to connect their accounts from external services including, but not limited to, Xbox Cloud Gaming, PS Remote Play, Nvidia GeForce NOW, Amazon Luna, Steam, Netflix, and Google Play, Apple Arcade. For instance, based on recent history of gameplay, the platform operating service application can then insert those games into the compatible games list within their library or otherwise adjust the Integrated Dashboard content. Users can then use the software service button to open directly into a dashboard of their compatible games across multiple external services. Further, this allows the platform operating service's remote service to provide enhanced suggestions to users based on a multitude of inputs, such as device state, user account information, platform preferences, and more.

In some embodiments, the content listed in the Integrated Dashboard may be available to stream from an external service within the platform operating service application. The user is able to view details about the content and launch the content without leaving the application. The user can move between the application and the external content by using the software service button(s) and continue to leverage platform operating service features. The user journey begins when the user opens the Integrated Dashboard by pressing the software service button or manually opening the service. The user then navigates the Integrated Dashboard using the smart mobile game controller and finds a game on the Integrated Dashboard that is available on an external gameplay service. After the user presses a button on the smart mobile game controller to launch the game, a content browser is opened inside of the platform operating service application. The user plays the game without having to leave the application, leveraging the same smart mobile game controller features as installed games.

The browser can allow users to return to the personalized dashboard by pressing the software service button and then confirming their intention to exit. This confirmation dialog can be provided to provide a better user experience as sessions on external gameplay services often take considerable time to initialize. Using a software service button, which can be otherwise unavailable for games on external gameplay services, enables the platform operating service application to support all standard mobile controller inputs in a full-screen immersive experience while still enabling the platform operating service application to suspend or end the experience when a user requests to do so.

Additional embodiments could include external computing devices streaming games into the application, games available within the platform operating service, or games available within a specialized browser or content rendering mechanism. This could also enable users to launch and/or play games renderable by the browser functionality that are included with or downloaded into the platform operating service application, as well as launch and/or play games within a browser application external to the platform operating service. Another embodiment could also be launching into an external application for the purpose of enabling the user to play games. Additional embodiments can leverage other embedded content runtimes to stream games into the application.

It should be understood that these are merely examples and that other implementations can be used. Accordingly, none of the details presented herein should be read into the claims unless expressly recited therein.

Example: Contextually-Aware Platform Service Switcher

Due to limitations of computing devices, using a platform operating service may interfere with or disrupt other content services when used simultaneously. This adds complexity for users attempting to engage with the controller's platform operating service while also interacting with content on other platform operating services. So, it is desired to allow users to switch between platform operating services seamlessly without disrupting their experience on other services, such as an active gaming session. In one embodiment, the controller, computing device, embedded software, and platform operating services work together to intelligently contextualize the user's intent and reduce disruptions in their ability to consume and interact with content, as well as enhance the experience by allowing simultaneous and intuitive interactions using user input device(s) (e.g., a single hardware button) on the controller.

In some embodiments, external platform operating services can be enveloped into subordinate views within the controller's platform operating service using a contextually-aware software service button on the controller. This view maintains the content state of the external platform operating service while allowing the user to engage and interact with content within the controller's platform operating service.

The platform operating service can be able to launch external platform operating services, such as Xbox Cloud Gaming, in an encapsulated interface. While this content is active, the controller's software service button can operate contextually to toggle focus between the external content and the platform operating service interface. Further, the controller can automatically switch functional context of all controls between the external content and the platform operating service in response to focus state changes. By keeping the external content active, the external platform operating services do not get disrupted by context switching between these interfaces.

While in the platform operating service, the user is able to engage with the interface as normal, including launching other content, such as native games, or placing the platform operating service in the background within the computing device. Regardless of user engagement, the external platform operating service state is maintained within this subordinate view. The controller and platform operating service detect these events and appropriately assign contextual behavior to the software service buttons to allow the user to foreground the application as normal and then return to the appropriate contextual state of automatically toggling focus.

The platform operating service can engage with various forms of content including launching native-installed and cloud-enabled games using third-party platform operating services directly from within the controller's platform operating service application. For cloud-enabled gaming services, an external platform operating service, such as a web browser, can be used. In normal use, the user would launch these services in a browser run on the computing device. This browser operates independently of other platform operating services and is subject to the limitations of the operating system of the computing device, such as being terminated while in the background.

The platform operating service allows the user to launch a cloud gaming platform operating service within a subordinate view within the controller application, preserving the state of the cloud gaming service, while allowing the user to engage with other content within the controller application through a contextually-aware software service button on the smart mobile gaming controller or other controller input.

When the user presses the associated software service button on the controller, the cloud gaming platform operating service transitions into a non-focused view, such as picture-in-picture, alternative UI, or otherwise, preserving its state while delegating user interactions from the controller back to the controller's platform operating service. When the user presses the associated software service button, or other assigned input, on the controller while the external platform operating service is running in the non-focused view, the view can be brought back to a focused state, restoring input from the controller back to the service, enabling a seamless transition between services.

If the platform operating service is unfocused in a subordinate view and the user launches another natively-installed platform operating service, such as a mobile game, the controller can detect that the user is currently using a natively-installed platform operating service and can intelligently change the behavior of the software service button to take the user back to controller's platform operating service when pressed. After returning, the controller's platform operating service intelligently reassigns the software service button function to its focus toggle behavior, allowing the user to once again seamlessly switch between natively-installed external platform operating services and cloud-enabled platform services through simple interactions with the controller.

By allowing the platform operating service to launch external platform operating services within a contained environment, the platform operating service prevents the services from being terminated by the device operating system, providing the user with a seamless experience for both services. This provides external content state preservation. Also, by intelligently applying contextual awareness, the controller can propagate intended user interactions to the appropriate service automatically, while simultaneously allowing switching between services, including native content, cloud gaming content, and the platform operating service itself. This provides contextual user input handling. Further, by algorithmically assessing various data points such as service state and user actions, the controller is able to associate user interaction with implied intent and provide a seamless transition between services without disrupting the experience or associated services. This provides contextual software service functionality.

As can be seen from the above, the integration of the platform operating service, device operating system, and controller allows for seamless switching between content mediums, such as natively-installed games, first-party content, and cloud-enabled platform operating services using a software service button on the controller. This switching uses persistent self-contained mechanisms that assess user engagement and system context.

Also, an alternative implementation launches cloud-enabled services from within the platform operating service to utilize the default computing device's OS handling of the services, such as integrated web browsers. However, this can provide an unreliable experience that often discards the service state while context switching between services, forcing the user to restart and in some cases, even re-authenticate, services upon return. Using a separate internal context within the platform operating service also runs the risk of the user having their service state suspended or terminated, causing similar frustrations.

Handling these services within a self-contained embodiment, such as picture-in-picture, that can persist the state while intelligently handling input context with the controller overcomes these problems. Using a self-contained embodiment to launch cloud-enabled platform operating services and keep them running in a non-focused state while using other aspects of the platform operating service provides unique use cases where a user can wait for content to load, players to join, a game to start, and otherwise, while engaging with the platform operating service, including switching or launching into another game, viewing other content, or backgrounding the app altogether and returning to their game session using the software service button. The container embodiment can be extended in other ways (e.g., to support additional features from the platform operating service to be used while in an external operating service context). These features can include, but are not limited to, voice communications, text communications, mobile game controller settings, and more.

Example: Automatic Content Capability Detection

Content available from various software marketplaces, such as Google Play, have various levels of support for mobile game controllers. These marketplaces are not guaranteed to implement a way for users or platform operating services to determine the level of support and associated capabilities for mobile game controllers in regard to provided content. In one implementation, the controller's behavior and end-user experience can be enhanced by content that supports mobile game controllers to ensure functionality. As such, a way to determine whether or not content has controller support, and to what degree, could enhance the end-user experience.

In some embodiments, the platform operating service can automatically detect the degree to which content supports controllers, a content datastore can be created that defines the level of support for controllers to a degree of reliability and quality that would provide an enhanced user experience. This datastore can be created by manually testing a comprehensive content collection that encompasses the breadth of content likely to be consumed by users within the platform operating service. Each piece of content can be tested with a smart gaming controller to determine the degree of compatibility with the mobile game controller.

To preserve user privacy, the smart mobile gaming controller can provide this compatibility information from a central repository to the platform operating service that scans the user's computing device to assess which supported content is available. This verified content list can then be processed by the smart gaming controller and automatically displayed while providing contextual actions within the platform operating service according to content compatibility levels without exposing non-relevant data to external devices or services.

To build the library, a comprehensive list of content to be tested can be curated from multiple sources and first-party research. This list serves as a starting point for testing and curation of content and associated compatibility. This list is formed through aggregating potentially-compatible content from online resources, manual data entry, and other sources. Manually testing this content with a mobile gaming controller allows for a determination of the level of support to be made. Multiple controllers can be tested to verify support consistency, including first-party controllers, generic controllers, wireless controllers, wired controllers, and others. This process can involve discovering, installing or accessing, and consuming the content in an appropriate context using the mobile gaming controller. In some embodiments, such as game applications, for example, this level of support is determined by play testing content in various configurations for the mobile game controller, and other controller options. Once the level of support is determined, the results are stored in a data repository, which can be utilized by the smart gaming controller.

To determine relevant content for the user, the smart mobile gaming controller can intelligently detect supported content on the mobile gaming device. Compatible content is then contextually evaluated, so that the user can view compatible content within the smart gaming controller interface with contextually appropriate actions available. For example, content available on the user's mobile gaming device can be displayed within a collection in a dashboard of a user interface. This collection can be organized by level of support, with each piece of content being displayed with contextually-appropriate actions. In this embodiment, for supported content, said actions can include the ability to launch natively-installed content, stream or view cloud-enabled content, share content through content sharing services, and more. In addition, unsupported content can be displayed to the user with appropriate contextual actions, such as the ability to launch a marketplace review to encourage content providers to enhance their offerings with better mobile game controller support.

By observing and storing different levels of controller support, including, but not limited to, "Unsupported", "Tutorial Unsupported", "UI Unsupported", and "Fully Supported", appropriate expectations for the user can be set, and content can be categorized adequately within the platform operating service. This provides a level of granularity in the controller support database. Further, automatic detection of supported games can be provided. By scanning the user's computing device to detect available content and automatically detect which content can be displayed in the platform operating service based on compatibility level, the smart mobile gaming controller can provide a seamless browsing experience for the user. Users can intuitively make a connection between what they see in the platform operating service and what they have installed on their computing device, while having access to contextually-appropriate actions.

Regarding unsupported content, by detecting available content that does not have adequate levels of support, the smart mobile gaming controller can be able to provide users with options to enhance their experience. Allowing users the ability to send a request for controller support to content providers when they interact with a non-supported content within the platform operating service effectively creates incentives for the mobile game industry to prioritize controller support and empowers users to self-advocate for a better experience.

Online web-based databases can provide some information regarding content capability with mobile game controllers. However, these sources typically do not provide detailed levels of support that adequately inform users of the expected user experience. Further, these services typically do not provide the integration of a smart mobile gaming controller that automatically assesses available content on a mobile gaming device to then determine, contextualize, and display the content with appropriate actions to the user. These services are often outdated, lacking an adequate coverage of available relevant content and are difficult to find, digest, or access from a mobile gaming device's available platform operating services. In contrast, these embodiments allow for streamlined integration with the mobile gaming controller, providing the user with contextual actions available via the hardware interface of the mobile game controller in addition to the platform operating service UI.

Further, due to various mobile gaming device limitations, determining support for installed games was not previously possible due to user privacy concerns with reporting information to a remote software service. These embodiments facilitate a streamlined user experience with appropriate contextual actions, providing a reliable repository of content with mobile game controller support needed to be created. Using this repository intelligently and responsibly to assess content availability on a mobile gaming device, while keeping user privacy intact, provides an advantage. Also, user privacy changes by mobile gaming device's operating systems, such as Android, can make processing this information remotely impossible, as applications found to be doing so might be flagged and removed from the marketplace.

There are many alternatives that can be used with these embodiments. For example, use of the controller can be extended to synthesize support for content that would otherwise be unsupported. Another alternative relates to adding a platform operating extension that would enable content publishers to more readily add controller support to their content.

Example: Rich Content Browsing Multitasking on Device Operating Systems with Multitasking Limitations External platforms can exhibit limited support for a number of common multitasking operations, such as switching between applications or viewing multiple applications at the same time. In addition, some device operating systems provide further restrictions to the platform operating service's ability to create such capabilities. One embodiment can help ensure users can engage in multiple activities on the platform operating service simultaneously, even when the device operating system places the aforementioned restrictions on the platform operating service. This embodiment can also enable users to engage in activities outside of the platform operating service while simultaneously engaging in activities on the platform operating service. Further, techniques can be used to drive user awareness of the limitations of the device operating system and surface rich information about the state of the content. For example, if a user is using a gameplay platform that requires them to wait in a virtual queue, the user's position in the queue can be surfaced even while the user is engaging with other surfaces within the platform operating service.

In one embodiment, a platform operating service is provided that can include a browser component capable of displaying static or interactive content. This browser component can be displayed on its own or as a subordinate view of other user interfaces within the platform operating service. If hosted on a gameplay device with a software service button enabled controller attached, pressing the software service button can toggle between the full screen state or the subordinate view state of the content browser component. In one embodiment, the component, while in a subordinate view, could be moved around by the user using a gesture. In another embodiment, the view could be integrated into the overall service UI. In yet another embodiment, the view could persist even outside of the service UI as an overlay. Performing a touch gesture or other interaction on the subordinate component could also toggle between the full screen and subordinate state of the component.

In some embodiments, the content browser can be distinct from similar components provided by the device operating system. This could be necessary because the device operating system component may not support certain kinds of rich content. The browser component could maintain and store rich state of the content within, for example, in the case of a game, the gameplay state, or in the case of a video, the time the video is being played, playback state, volume, brightness, and so on. Further, the embodiment can include, but is not limited to, the availability of an internal or external content experience, such as Nvidia GeForce Now, that could require a user to queue before actively engaging with the content. The content browser component could launch into such a content experience and display a dynamic representation of the content in the browser, such as the user's position in the queue.

In some embodiments, the content browser may not display on user interface surfaces outside of the platform operating service, potentially due to lack of support from the device operating system. In such scenarios, the platform operating service may surface additional surfaces to educate users about this lack of support and the expected behavior of the content browser. Such a behavior could require the use of alternative surfaces provided by the device operating system, such as, in the case of a mobile operating system, a push notification or even the picture-in-picture system enabled in the device.

One embodiment can utilize a content browser that is capable of displaying a number of rich media, including, but not limited to, photos, videos, interactive web pages, and games. When displayed in full screen, the content browser can receive input from the mobile game controller so that the user can interact with the content. The browser can be launched from the integrated dashboard or other interfaces of the platform operating service via controller input on, or attached to, the gameplay device.

In some embodiments, the controller can enable the user to continue using other portions of the platform operating service while engaging with content within the content browser, or queuing for access to content on an external service through various input interactions, such as a software service button, which could interpret short and long press states. The software service button can be contextually aware such that these press patterns can expand the content browser into full screen, or shrink into a subordinate view, or perform custom behaviors within the external content, depending on the current state of the content browser and associated press. While in the subordinate state, the content browser can be displayed on the platform operating service at the same time as other surfaces of the platform operating service, while the service delegates input from the mobile game controller away from content, and instead propagate input to allow the user to navigate and interact with other interfaces. The content browser can maintain the session state of the content while moving between these subordinate states, ensuring a user does not lose their content state while interacting with the platform operating service. This could be done by preserving the content browser instance in the gameplay device memory while the user interface for the content browser component transitions between the relevant states. This transition can also be animated or communicated to the user in a manner that reinforces the behavior, providing a seamless user experience.

In some embodiments, while in a subordinate state, the content browser can be displayed over other interfaces of the platform operating service and can be moved around using a user gesture or other user input. The content browser can provide visual or haptic feedback to the user and fluid animations to suggest aesthetically pleasing locations to place the browser within the platform operating service. Further, the content browser can be closed through a series of inputs to a controller attached to a computing device.

When the user exits the platform operating service, the current embodiment can indicate to the user the effect of this action on the state of the content browser. In some embodiments, this can be done by presenting a push notification to the user, or leverage facilities provided by the device operating system, such as iOS's Live Activities or Dynamic Island functionality, Android's notification tray, a UI affordance, or other operating system affordances that present the state of background operations. One embodiment of such a behavior could be indicating to the user that because the content browser is not visible, the device operating system may elect to end the content browsing session after a period of time. Another embodiment could be indicating to the user the current position the user is in a queue for an external gameplay service.

In some embodiments, the platform operating service can ensure the device operating system does not terminate the content browser. In such embodiments, the mobile game controller could interact with the device operating system to request the non-suspension of the platform operating service's core processes; the platform operating service could request the mobile game controller perform such a routine when the user exits the platform operating service. Since such a routine could impact the battery life of the gameplay device, the platform operating service could allow the user to specify the preferred amount of time they would like to keep the content browsing routine alive.

A dynamic content browser embodiment can enable the user to activate the subordinate component without losing their position in an external content queue. Further, this embodiment can use a software service button to activate or deactivate the subordinate service component. Also, by indicating the background behavior of the content browser to the user, the platform operating service allows the user to better understand the multitasking behavior of the gameplay device. Further, content browsing termination prevention can be provided. This behavior can be constructed using the unique capabilities of the controller to interact with the device operating system as well as the platform operating service, allowing the platform operating service to interact with the device operating system in ways that otherwise may not be allowed by the device operating system. By preventing the termination of the content browsing session, the platform operating service allows the user to perform multiple simultaneous activities on the computing device without losing the state of their content browsing session. Such a capability could be otherwise unavailable to the user.

Leveraging the platform operating service, device operating system, and computing device allows users to perform a number of other activities while engaging in gameplay or content browsing activities. No other platform operating service is able to provide a dynamic content browser with background multitasking capabilities while hosted on device operating systems with multitasking model restrictions as described.

In some environments, users are able to launch and queue for content in external applications, but due to device operating system limitations, for example the inability to programmatically launch web browser-based applications (also known as PWAs), such experiences often could not be launched directly from the platform operating service and required users to launch such experiences manually. Further, on certain device operating systems, such experiences were limited in their ability to intelligently educate users about their background behavior and are unable to prevent termination of the content browsing session, causing significant user frustration.

The development of a browser capable of displaying rich and interactive content experiences enables an extension of the browser capabilities to allow more dynamic behaviors such as described above. The development of the contextually aware platform service switcher and further development of methods to extract key information from content platforms that utilize queueing can also be used. The presence of the software service button can enable a one-click entering and exiting of the full-screen content browser experience via a subordinate interface, significantly simplifying the user experience. In one embodiment, the content representation feature as a picture in picture component could be applied to other parts of the platform operating service. In another embodiment the service can be used to view related content while in queue; for example, if a user is waiting to play a game, the user can see content related to the game, such as the game description, user generated content made using the game, or tips and tricks that could help with gameplay.

Additional embodiments include alternate indications of content or browser state to the user, including, but not limited to, displaying the user's position in the queue, indicating to the user that they are in a queue, a display of the content being viewed in the content browser (such as the name, or a representative icon of the content), or a display of the platform that the content is being hosted. A timer (i.e., not showing position in the queue but having a countdown) can also be used. In another embodiment, the user could be in a lobby, waiting room, or other chat-enabled interface, and the service could display the number of messages, direct communications, or other pertinent information. Further, the placement of the browser component or indication of the browser state could be placed in other positions within the platform operating service, for example, the browser could be placed as a tile within the integrated dashboard of the platform operating service. On some device operating systems, cross-application picture in picture functionality is enabled for static displays of content, so alternative embodiments also include the use of this static picture in picture display component to display a user's position in a queue.

In some embodiments, alternative placement or display mechanisms can be used to enable the user to perform other activities on the platform operating service while the content browser is active. For example, the content browser could be placed in the background of the integrated dashboard, displayed on top of the integrated dashboard but with enough transparency to see other portions of the platform operating service, or only a portion of the content browser could be displayed to the user, or the presence of a content browser session could be indicated using a service indicator. Further, some alternative embodiments could include displaying other portions of the platform operating service over or alongside the content browser; this could still enable the user to use other portions of the platform operating service while the content browser remains active, or inversely, enable use of the content browser while displaying other interfaces of the platform operating service. Embodiments can be used that include any combination of such alternative placement or display states, and could move between these states based on user input or other stimuli.

In other embodiments, the browser interface in a subordinate state could be used to surface other forms of contextual actions besides returning to the content browser in a full screen state. For example, tapping and holding the browser interface, or pressing the software service button, could invite another user to play with the user, exit the content, or view details or metadata about the content inside the browser component. Other embodiments could also include the platform operating service's automatically reopening the full screen content browser experience without user intervention; in such embodiments, the platform operating service could return to the content browsing experience automatically when the user-requested content is available for viewing or interaction. Another alternative embodiment could be applying the aforementioned techniques on internal or local gameplay platforms that may require queueing to access. In other embodiments, the behavior of the content browsing termination prevention could dynamically respond to a number of factors instead of, or in addition to, the user-specified behavior. For example, the content browser could prevent termination for a longer period of time when the computing device's battery level is higher, reduce the termination period when the gameplay device has weak network signal, or disable the functionality entirely when the device operating system indicates it is operating in a power conservation state.

In another embodiment, when the content browser recognizes that content enters a queue, or other recognized passive state, it could enter the subordinate state automatically and/or indicate to the user that they can perform other activities on the platform operating service while waiting on the state to become active.

As described above in a previous embodiment, the platform operating service can provide a picture-in-picture component that is distinct from the picture-in-picture component provided by the device operating system. This could be due to a limitation in the device operating system, such as limiting the content type eligible for picture in picture support. The content browser component can maintain and store state of the content within, for example, in the case of a game, the gameplay state, or in the case of a video, the time the video is being played.

When a content browser, such as an iOS web view (e.g., WKWebView) is removed from one view hierarchy and installed into another view hierarchy, its contents and metadata, as a whole, can remain intact. Also, when a content browser is rendered inside a parent container, any motion that the parent view undergoes introduces no render issues on the subordinate content. "Swapping" the contents of the web session between the subordinate and full screen mode, instead of re-loaded, allows the user not to lose their content's context, such as loading progress, current display and data state, or potentially their spot in a queue. This can be achieved by having the contents stored globally in memory and passed, by an interactor, to another view. Thus, the reference to the content data is not lost when dismissing one location and showing another. When the user engages the controller input to toggle between locations, a swap routine can be performed; that is, if the content browser is open, switch to browser; if the browser is open, switch to PiP. In this location swap routine, the new appropriate location can be rendered, with the old one being torn down first. Then, the parent view of the content can be adjusted to be that of the newly rendered location. A custom animation routine can be employed such that the deferred addition of the content feels smooth and clearly communicates the behavior of the transition to the end user.

Figure 15:
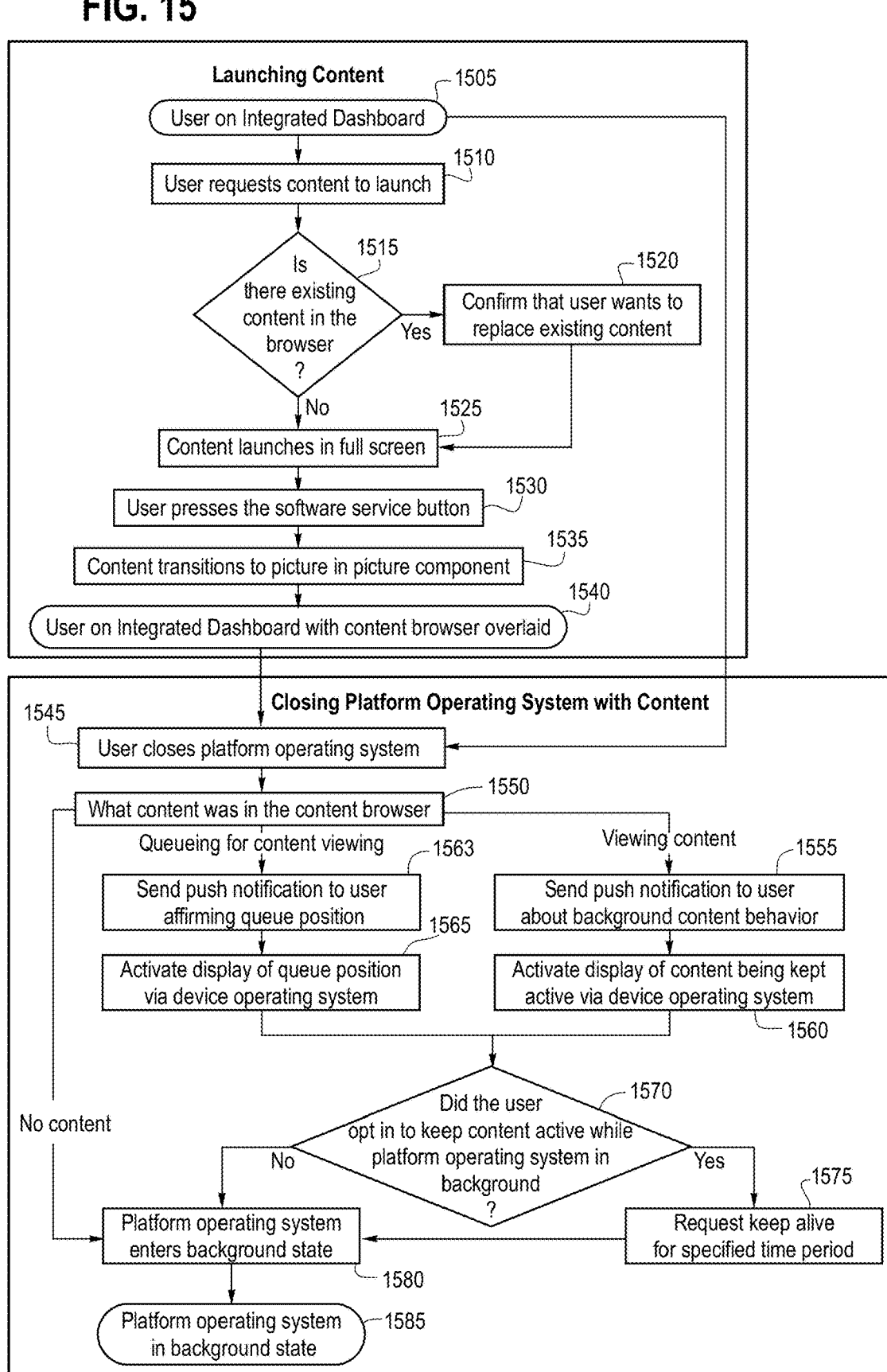
FIG. 15 is a flow chart of a method of an embodiment.

FIG. 15 is a flow chart of a method of an embodiment. As shown in FIG. 15, the user is on the integrated dashboard (act 1505) and requests content to launch (act 1510). Then, a determination is made regarding if there is existing content in the browser (act 1515). If there is, the method confirms that the user wants to replace existing content (act 1520). If there isn't, the content launches in the full screen (act 1525). Next, the user presses the SSB (act 1530), in response to which the content transitions to a picture-in-picture component (act 1535). The user is then shown the integrated dashboard with the content browser overlaid (act 1540).

When the user closes the platform operating service (act 1545), a determination is made as to what content was in the content browser (act 1450). If the browser was viewing content, a push notification is sent to the user about background content behavior (act 1555) and a display of content being kept active is activated via the computing device's operating system (act 1560). If the content is queued for content viewing, a push notification is sent to the user affirming the queue position (act 1563) and a display of queue positions is activated via the device's operating system (act 1565). In either event, a determination is then made of whether the user opted in to keep content active while the platform operating service is in the background (act 1570). If the user opted in, the request is kept alive for a specified time period (act 1575). If the user didn't opt in, the platform operating service enters into a background state (act 1580 and 1585).

Figure 16:
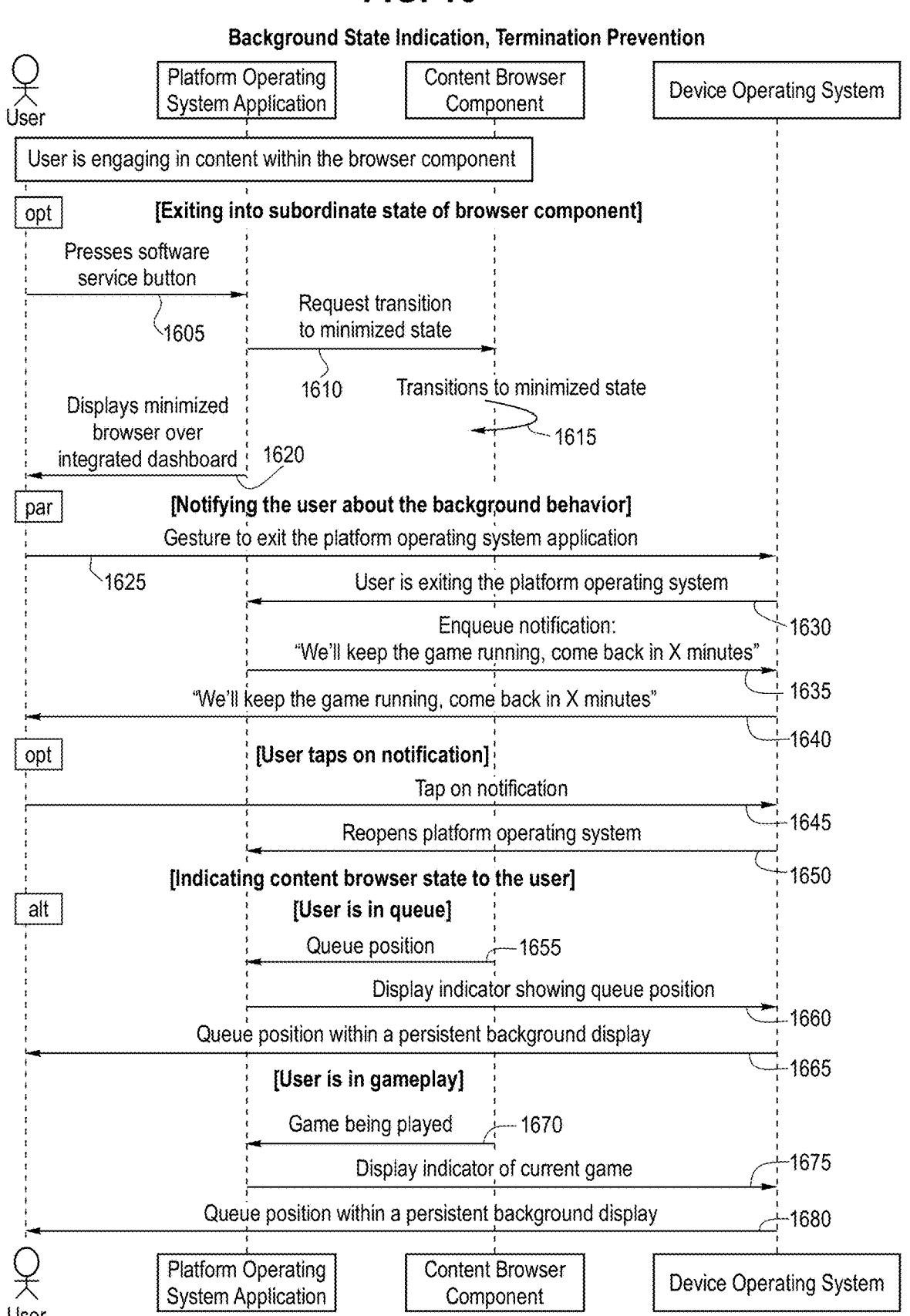
FIG. 16 is a flow diagram of a background state indication/termination prevention method of an embodiment.

FIG. 16 is a flow diagram of a background state indication/termination prevention method of an embodiment. As shown in FIG. 16, the user presses the SSB (act 1605), and a request is made to transition to an un-focused state (act 1610), which triggers the transition (act 1615). An un-focused browser representation is displayed (act 1620), and a gesture is made to exit the platform operating service (act 1625). Then, the user exits the platform operating service (act 1630). Enqueue notifications are sent (acts 1635 and 1640), and the platform operating service is reopened after a notification is tapped (acts 1645 and 1650). The queue position information is sent (act 1655), and an indicator is shown (acts 1660 and 1665). A game is being played (act 1670), the indicator is displayed of the current game (act 1675), and the queue position is displayed (act 1680).

Figure 17:
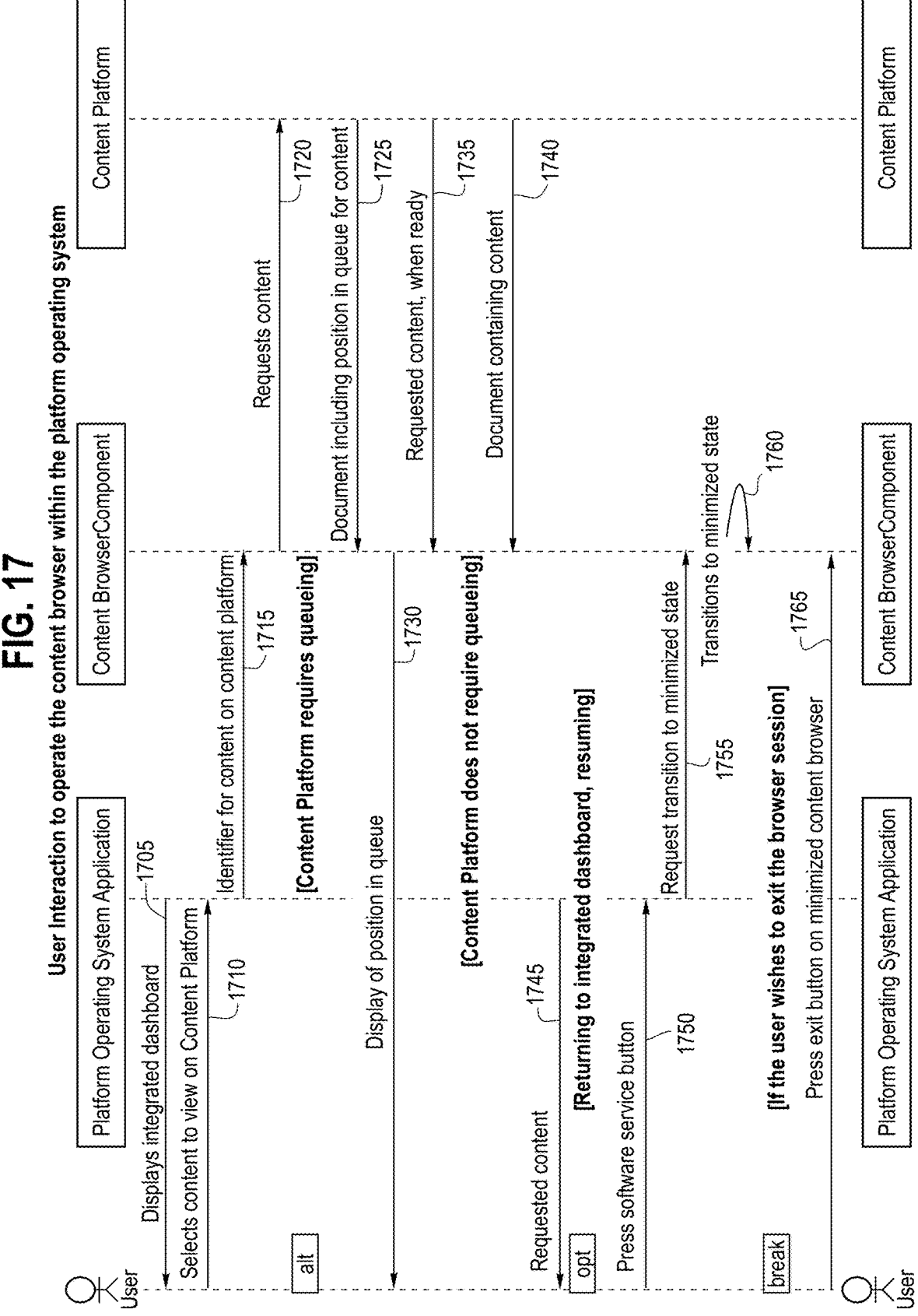
FIG. 17 is a flow diagram of a user interaction of an embodiment.
Figure 18:
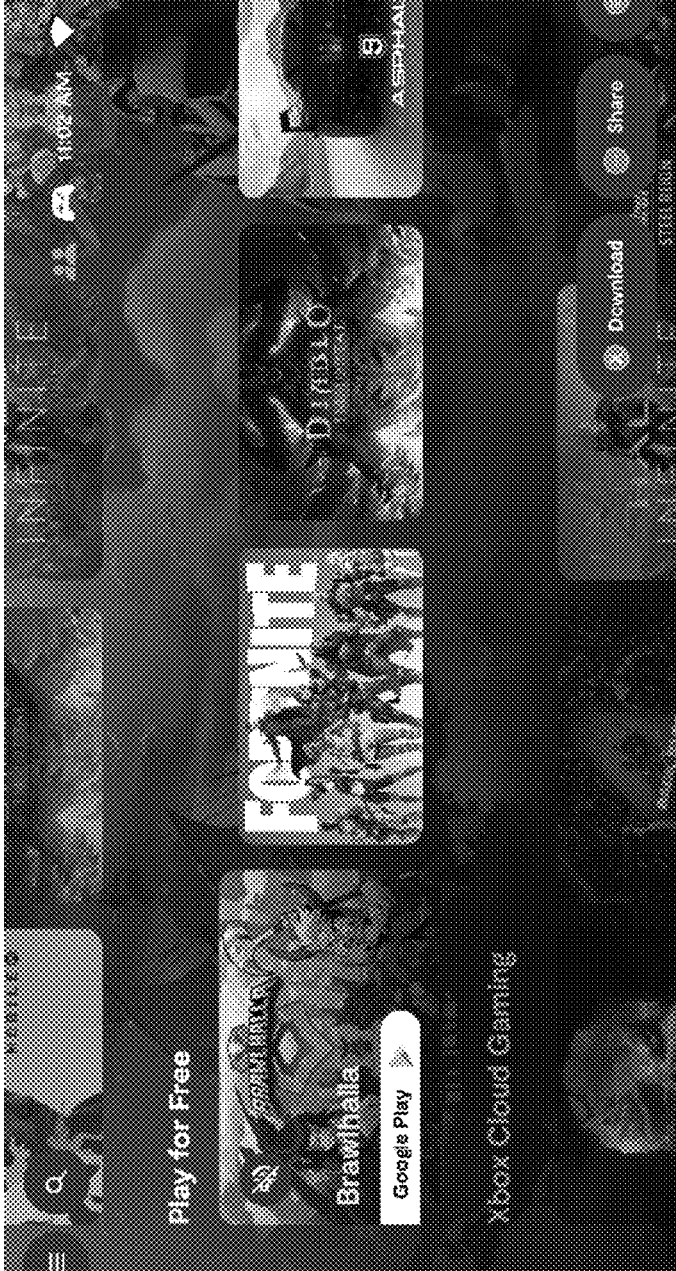
Figure 20:
Figure 21:
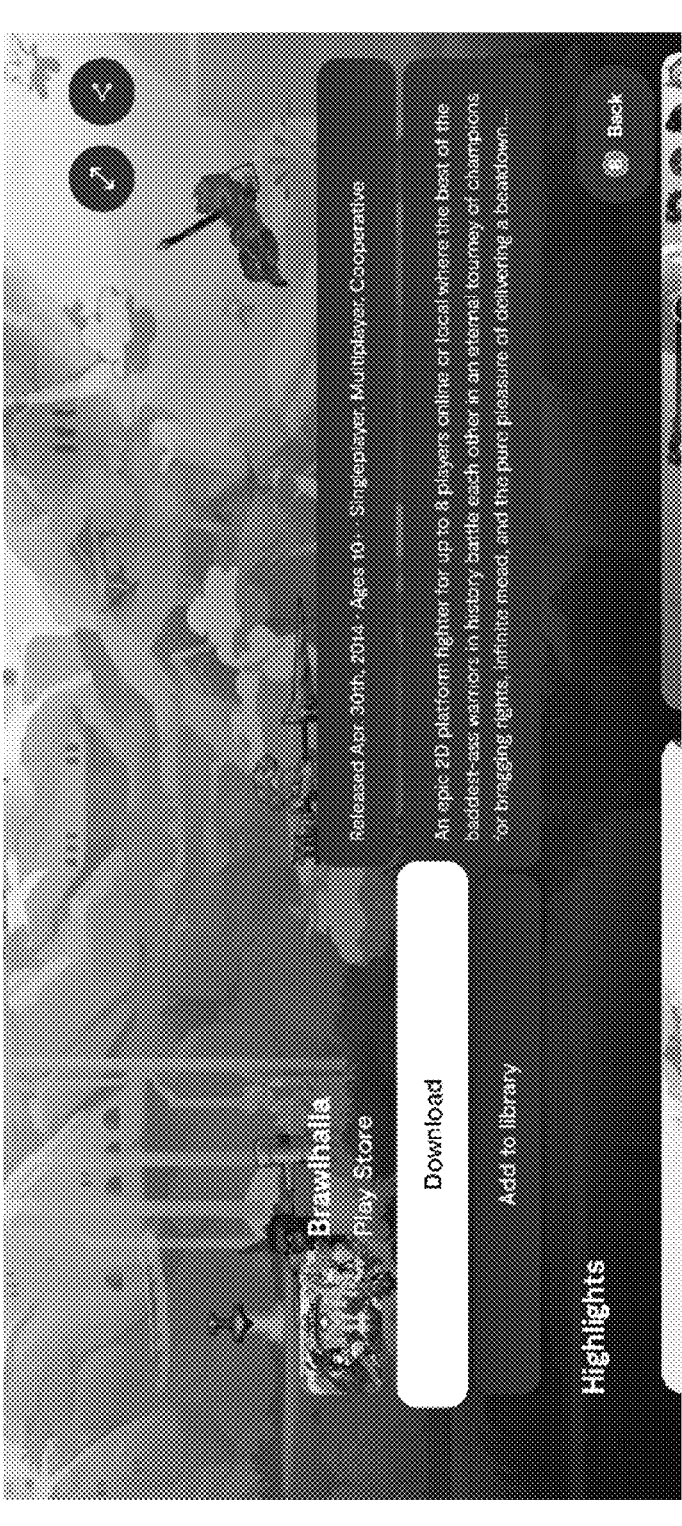
Figure 22:
Figure 23:
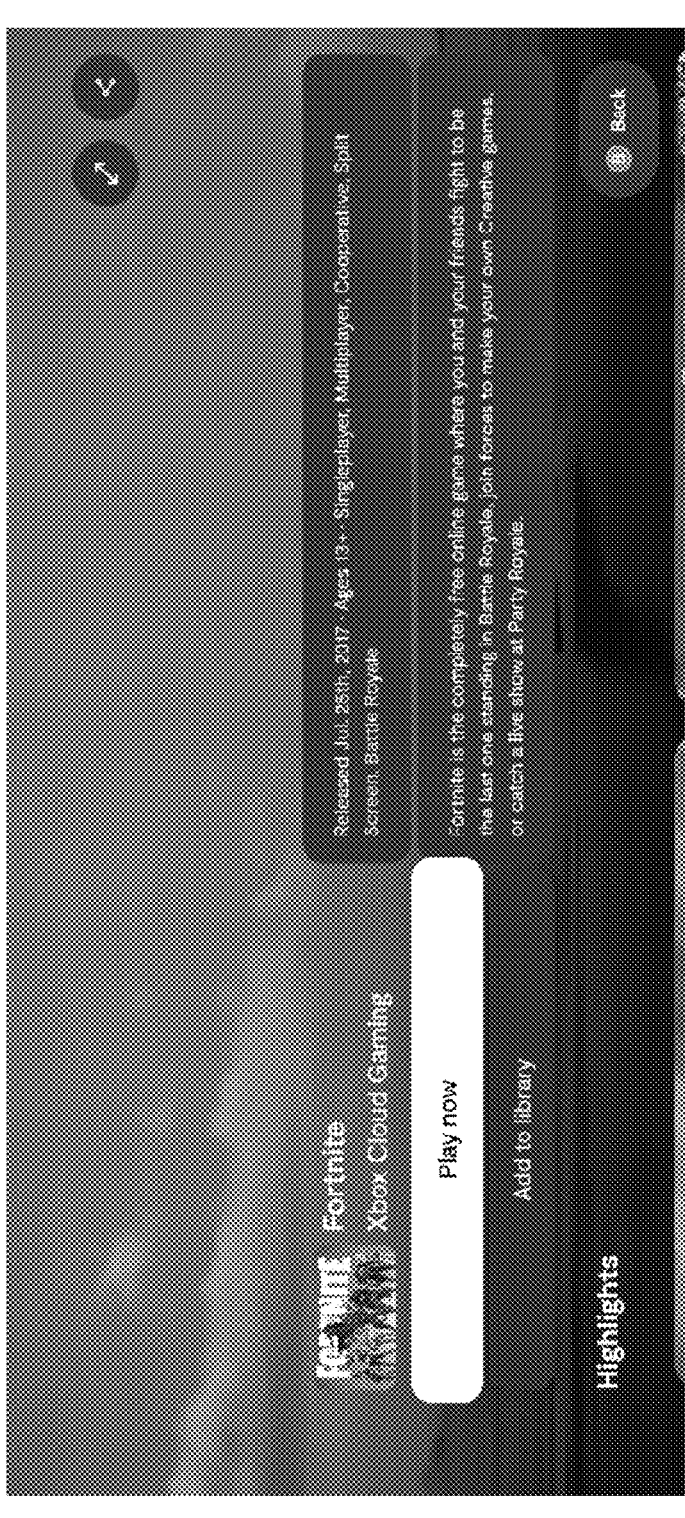
Figure 24:
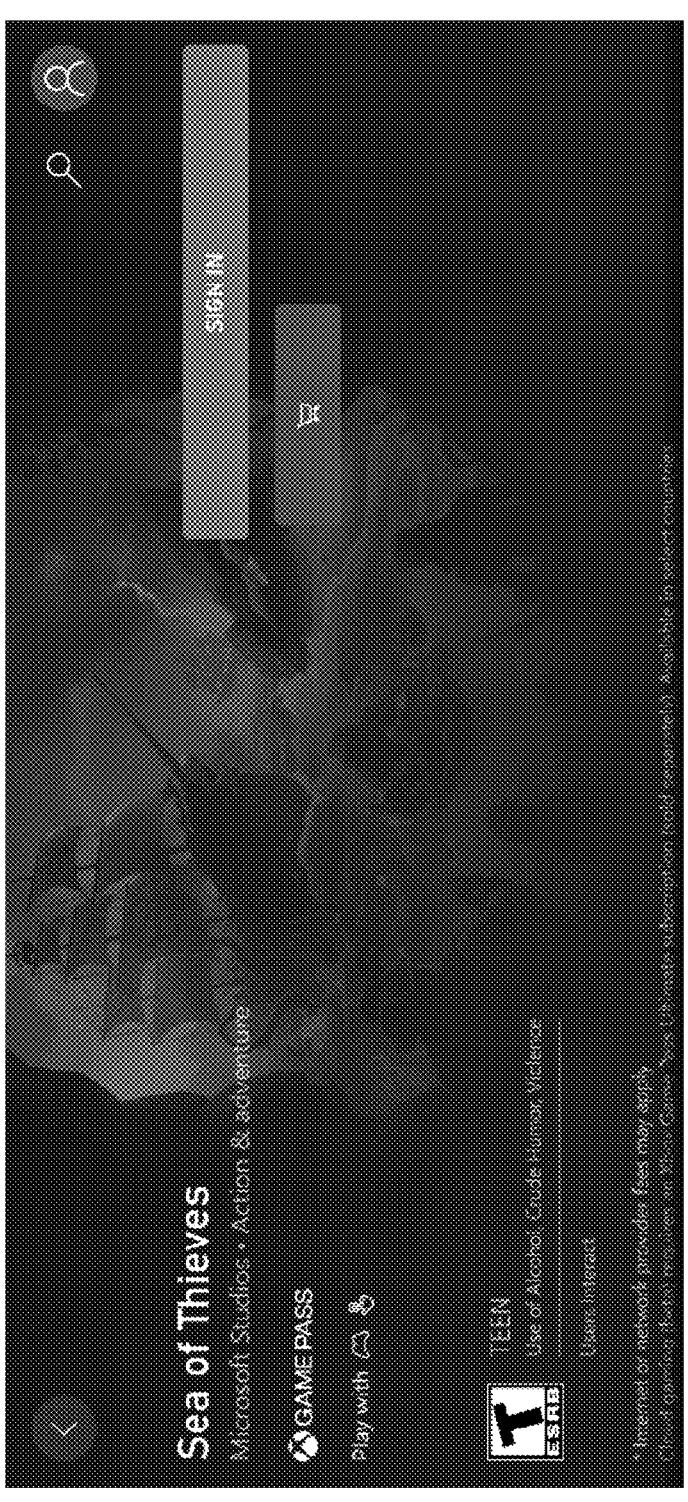

FIG. 17 is a flow diagram of a user interaction of an embodiment. As shown in FIG. 17, an integrated dashboard is displayed (act 1705), and a user selects content (act 1710). An identifier for the content is sent (act 1715), and request is made for the content (act 1720). A document is returned with a position in a queue (act 1725), which is displayed (act 1730). The content is requested when ready (act 1735) and then returned (acts 1740 and 1745). After the SSB is pressed (act 1750), a request is made to transition to an un-focused state (act 1755), and the transition is made (act 1760). The exit button is pushed to exit the browsing session (act 1765). Many alternatives can be used. For example, the SSB can launch the controller app or the controller app can be automatically launched upon device plug in but force users to tap the screen to trigger the focusing/un-focusing of content. In another embodiment, a visual affordance is not used, and the content browser is kept alive in the background so that users derive the benefit of keeping their place in the game. Further, a user can launch content, and a countdown or similar affordance can appear on the screen while it is loading or otherwise in a passive state. This would give the user the benefit of being able to use the wait time productively (and a PiP or other un-focused content would not need to be supported (besides the initial countdown, which is not an un-focused piece of content)). In this way, the user can utilize the platform operating service productively while the content the user wants to engage with loads in the background. In yet another embodiment, other user inputs on the controller, such as a touch screen element on the computing device can perform that function.

Many alternatives can be used. For example, the SSB can launch the controller app or the controller app can be automatically launched upon device plug in but force users to tap the screen to trigger the focusing/un-focusing of content. In another alternative, a visual affordance is not used, and the content browser is kept alive in the background. This way, users derive the benefit of keeping their place in the game. Further, a user can launch content, and a countdown or some similar affordance can appear on the screen while it is loading. This would give the user the benefit of being able to use the wait time productively (and a PiP or other un-focused content would not need to be supported (besides the initial countdown, which is not an un-focused piece of content)). In this way, the user can hang out in the platform operating service while the game the user wants to play loads in the background, allowing the user to spend that otherwise idle time productively. In yet another alternative, instead of the SSB taking the user in and out of the un-focused state, other user input devices on the controller or a touch screen element on the computing device can perform that function.

CONCLUSION

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A non-transitory computer-readable storage medium storing a computer program having instructions that, when executed by one or more processors in a computing device, cause the one or more processors to provide a game controller app that is configured to:

receive an input from a game controller in communication with the computing device indicating actuation of one or more user input devices of the game controller; and in response to receiving the input:

un-focus content while maintaining resources in the computing device for the content; and display a subordinate view of the content, wherein the subordinate view of the content is supported by the game controller app but not by an operating system of the computing device.

2. The non-transitory computer-readable storage medium of claim 1, wherein the subordinate view comprises a minimized display area in a picture-in-picture display.

3. The non-transitory computer-readable storage medium of claim 1, wherein the subordinate view comprises an overlay to a display area.

4. The non-transitory computer-readable storage medium of claim 1, wherein the subordinate view provides indicia identifying the content.

5. The non-transitory computer-readable storage medium of claim 1, wherein the subordinate view provides information about the content.

6. The non-transitory computer-readable storage medium of claim 5, wherein the information comprises an indication of a user's position in a queue to play the content.

7. The non-transitory computer-readable storage medium of claim 1, wherein the content is displayed in a browser.

8. The non-transitory computer-readable storage medium of claim 7, wherein the instructions, when executed by the one or more processors, further cause the one or more processors to:

prevent termination of the browser.

9. The non-transitory computer-readable storage medium of claim 1, wherein the subordinate view is movable by a user in a display.

10. The non-transitory computer-readable storage medium of claim 1, wherein the instructions, when executed by the one or more processors, further cause the one or more processors to:

automatically display the subordinate view.

11. The non-transitory computer-readable storage medium of claim 1, wherein the instructions, when executed by the one or more processors, further cause the one or more processors to:

provide an indication to a user that the user can perform other activities while waiting in a queue.

12. The non-transitory computer-readable storage medium of claim 1, wherein the content is playable via the game controller app.

13. A system comprising:

a game controller; and a computing device comprising:

a battery;

one or more processors; and a non-transitory computer-readable storage medium storing a computer program having instructions that, when executed by one or more processors, cause the one or more processors to:

receive an input from the game controller indicating actuation of one or more user input devices of the game controller; and in response to receiving the input:

un-focus content while maintaining resources in the computing device for the content; and display a subordinate view of the content;

wherein the content is kept un-focused for a limited period of time to avoid draining the battery.

14. The system of claim 13, wherein the subordinate view comprises a minimized display area in a picture-in-picture display.

15. The system of claim 13, wherein the subordinate view comprises an overlay to a display area.

16. The system of claim 13, wherein the subordinate view provides indicia identifying the content.

17. The system of claim 13, wherein the subordinate view provides information about the content.

18. The system of claim 17, wherein the information comprises an indication of a user's position in a queue to play the content.

19. The system of claim 13, wherein the content is displayed in a browser.

20. The system of claim 19, wherein the instructions, when executed by the one or more processors, further cause the one or more processors to:

prevent termination of the browser.

21. The system of claim 13, wherein the subordinate view is movable by a user in a display.

22. The system of claim 13, wherein the computing device's operating system does not support the subordinate view.

23. The system of claim 13, wherein the instructions, when executed by the one or more processors, further cause the one or more processors to:

automatically display the subordinate view.

24. The system of claim 13, wherein the instructions, when executed by the one or more processors, further cause the one or more processors to:

provide an indication to a user that the user can perform other activities while waiting in a queue.

25. The system of claim 13, wherein the content is playable via a controller app in the computing device.

26. A game controller comprising:

one or more processors; and a non-transitory computer-readable storage medium storing a computer program having instructions that, when executed by one or more processors, cause the one or more processors to:

send a signal to a computing device indicating actuation of one or more user input devices of the game controller, wherein in response to receiving the signal, the computing device is configured to:

un-focus content while maintaining resources in the computing device for the content; and display a subordinate view of the content; and send at least one additional signal to the computing device that keeps the content active while displayed in the subordinate view.

27. The game controller of claim 26, wherein the information comprises an indication of a user's position in a queue to play the content.

28. The game controller of claim 26, wherein the content is displayed in a browser.

29. The game controller of claim 26, wherein the computing device's operating system does not support the subordinate view.

30. The game controller of claim 26, wherein the content is playable via a controller app in the computing device.

31. The game controller of claim 26, wherein the at least one additional signal comprises an application program interface (API) call.

32. The game controller of claim 26, wherein the at least one additional signal is sent in response to a request from a controller app in the computing device.

* * * * *